US010198701B2

(12) United States Patent
Romanoff et al.

(10) Patent No.: US 10,198,701 B2
(45) Date of Patent: *Feb. 5, 2019

(54) SYSTEMS, METHODS, AND APPARATUSES FOR TRACKING STATUS OF TIME-SENSITIVE ARTICLES

(71) Applicant: VIVEO LABS, INC., East Palo Alto, CA (US)

(72) Inventors: Harris Gabriel Romanoff, East Palo Alto, CA (US); Ravi Shankar Venkata Dwivedula, San Jose, CA (US)

(73) Assignee: VIVEO LABS, INC., East Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,012

(22) Filed: Aug. 18, 2017

(65) Prior Publication Data

US 2018/0096266 A1 Apr. 5, 2018

Related U.S. Application Data

(63) Continuation of application No. 14/940,725, filed on Nov. 13, 2015, now Pat. No. 9,754,229.

(Continued)

(51) Int. Cl.
*G06Q 10/06* (2012.01)

(52) U.S. Cl.
CPC .................... *G06Q 10/06* (2013.01)

(58) Field of Classification Search
CPC . G08B 21/18; G08B 3/10; G08B 5/22; G08B 21/182; G08B 3/00; G08B 5/36;

(Continued)

(56) References Cited

U.S. PATENT DOCUMENTS 6,327,576 B1 * 12/2001 Ogasawara ............ G06K 17/00
705/22
8,655,321 B2 * 2/2014 Baer ..................... G06F 3/0481
455/412.2

(Continued)

FOREIGN PATENT DOCUMENTS

EP      1 319 928 A1   6/2003
JP      2008-536774 A  9/2008

OTHER PUBLICATIONS

Corrected International Search Report and Written Opinion in PCT Application PCT/US2015/060614 dated "Mar. 23, 2016" (Stamped with corrected Form PCT/ISA/210 on p. 5.

(Continued)

*Primary Examiner* — An T Nguyen
(74) *Attorney, Agent, or Firm* — Knobbe Martens Olson & Bear LLP

(57) ABSTRACT

One aspect of the application provides a cueing device. The device is configured to alert a user to a perishable item associated with the cueing device based on one or more cueing parameters indicative of an urgency of the perishable item and a context for alerting the user to a status of the perishable item. The device includes a visual output capable of providing multiple levels of visual alert. The device further includes an input capable of receiving, from the user, an acknowledgement to an alert, or a cueing parameter. The device further includes one or more sensors configured to detect environmental characteristics affecting the perishable item. The device further includes a wireless communication interface.

33 Claims, 30 Drawing Sheets

Related U.S. Application Data

(60) Provisional application No. 62/080,916, filed on Nov. 17, 2014.

(58) Field of Classification Search
CPC . G08B 5/38; G01K 1/02; G01K 1/026; G06N 5/04; G06N 99/005; G06Q 10/0833; G06Q 30/0623; G06K 7/10366
See application file for complete search history.

(56) References Cited

U.S. PATENT DOCUMENTS

| | | | |
|---|---|---|---|
| 9,754,229 B2 * | 9/2017 | Romanoff | G06Q 10/06 |
| 2004/0100380 A1 * | 5/2004 | Lindsay | G06K 17/0022 |
| | | | 340/540 |
| 2005/0021279 A1 | 1/2005 | Kuepper et al. | |
| 2006/0181961 A1 | 8/2006 | Hobkirk | |
| 2007/0254080 A1 * | 11/2007 | Schackmuth | G06Q 10/06 |
| | | | 426/523 |
| 2007/0258048 A1 | 11/2007 | Pitchers | |
| 2008/0052200 A1 * | 2/2008 | Bodin | G06Q 10/087 |
| | | | 705/28 |
| 2009/0303052 A1 * | 12/2009 | Aklepi | G06Q 10/08 |
| | | | 340/573.2 |
| 2009/0326957 A1 * | 12/2009 | Yang | F25D 29/00 |
| | | | 704/275 |
| 2010/0148958 A1 * | 6/2010 | Chen | G04F 1/005 |
| | | | 340/540 |
| 2011/0184865 A1 | 7/2011 | Mon et al. | |
| 2011/0270708 A1 | 11/2011 | Walden | |
| 2012/0258691 A1 * | 10/2012 | Baer | H04M 1/72563 |
| | | | 455/412.2 |
| 2012/0260683 A1 * | 10/2012 | Cheon | F25D 29/00 |
| | | | 62/125 |
| 2012/0274470 A1 | 11/2012 | Sandvick | |
| 2013/0191243 A1 * | 7/2013 | Jung | G06Q 30/0633 |
| | | | 705/26.8 |
| 2014/0101589 A1 * | 4/2014 | Hyun | F25D 29/00 |
| | | | 715/769 |
| 2014/0165614 A1 | 6/2014 | Manning et al. | |
| 2014/0304126 A1 * | 10/2014 | Kim | G06Q 10/087 |
| | | | 705/28 |
| 2014/0313055 A1 * | 10/2014 | Warkentin | H04Q 9/00 |
| | | | 340/870.16 |
| 2014/0358287 A1 * | 12/2014 | Lee | F25D 29/00 |
| | | | 700/275 |
| 2015/0048938 A1 | 2/2015 | Tew | |
| 2015/0112759 A1 * | 4/2015 | Hong | G06F 17/30 |
| | | | 705/7.29 |
| 2015/0186836 A1 * | 7/2015 | Chouhan | G06Q 10/087 |
| | | | 705/28 |
| 2015/0192475 A1 | 7/2015 | Eisenstadt et al. | |
| 2015/0294393 A1 * | 10/2015 | Aikawa | G06Q 10/10 |
| | | | 705/26.8 |
| 2015/0310385 A1 * | 10/2015 | King | G06Q 10/087 |
| | | | 705/28 |
| 2015/0310720 A1 | 10/2015 | Gettings et al. | |
| 2016/0140829 A1 * | 5/2016 | Romanoff | G06Q 10/06 |
| | | | 340/540 |
| 2016/0162715 A1 * | 6/2016 | Luk | F25D 29/005 |
| | | | 235/385 |
| 2016/0314514 A1 * | 10/2016 | High | G06Q 30/0631 |
| 2018/0053140 A1 * | 2/2018 | Baca | G01N 33/02 |
| 2018/0096266 A1 * | 4/2018 | Romanoff | G06Q 10/06 |
| 2018/0196403 A1 * | 7/2018 | Lagares-Greenblatt | |
| | | | G05B 19/048 |

OTHER PUBLICATIONS

International Search Report and Written Opinion in PCT Application PCT/US2015/060614 dated Mar. 23, 2016.

* cited by examiner

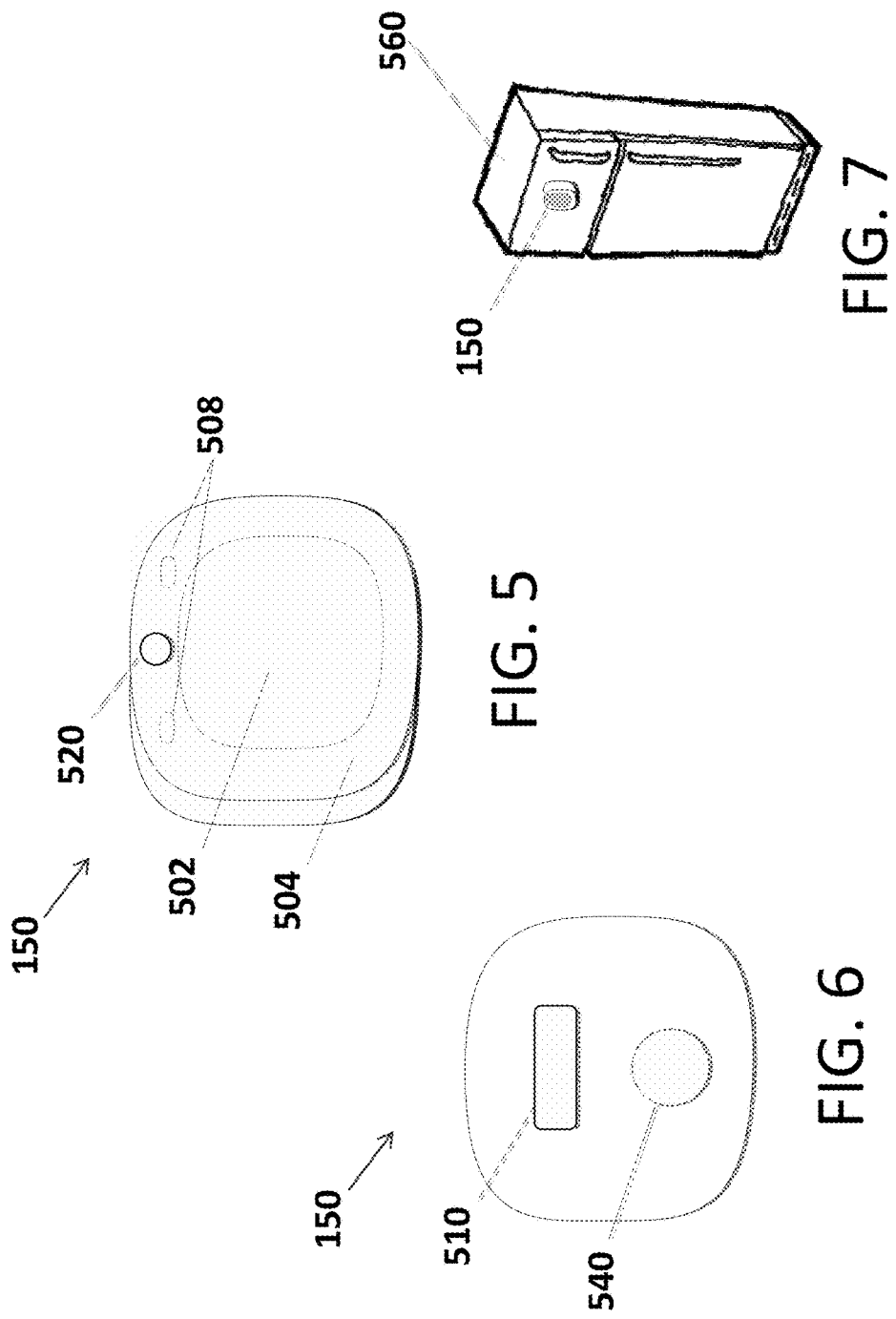

| INPUT | Case 1 | Case 2 | Case 3 | Case 4 | Case 5 | Case 6 |
|---|---|---|---|---|---|---|
| WHAT: Type of Reminder | Recurring | Infrequent, Recurring | Recurring | Recurring | Recurring | Recurring |
| WHEN: Time to Expiration | 1, 3 days | 2 | 2 | 2 | 2 | 1, 3 days |
| WHERE: Environment | Dark | Dark | Bright, Dark | Bright | Bright | Bright |
| WHO: User | Noisy | Serene | Serene | Serene | Serene | Serene |
| Learning | Default | Default | Default | Default | Mary, John | Mary |
| Object | Default | Default | Default | Default, A1 | A2 | Default, A1 |
| | | | | | | Obj$_x$ |

FIG. 19A

4070 Behavioral

| Reminder Type | Envelope Duty Cycle |
|---|---|
| Infrequent | Long |
| Recurring | Medium |
| Daily | Short |

4071 / 4073

4075 Sensorial — Default Values (4076)

| Time to Expire | Visual Hue Frequency | Aural Tone Frequency | Haptic Vibration Frequency |
|---|---|---|---|
| 3 days | Yellow | | High Spin |
| 2 days | Orange | | Med Spin |
| 1 day | Red | High Pitch | Low Spin |

4077

4080 Physiological — Default Values (4081)

| Environment | Visual Hue Amplitude | Aural Tone Amplitude | Haptic Vibration Amplitude |
|---|---|---|---|
| Dark | Low Lumens | N/A | High Power |
| Bright | High Lumens | N/A | Low Power |
| Noisy | N/A | High Volume | High Power |
| Serene | N/A | Low Volume | Low Power |

4085 Adaptive — Signal Filter (4086)

| | Signal Filter |
|---|---|
| A1 (Mary) | Prefers sound over vibration, higher response rate w/ 'High' for 'Recurring' reminder type |
| A2 (John) | Prefers vibration over sound and Higher response rate w/ "Low" for 'Recurring' reminder type |
| ...$A_n$ | |

FIG. 19B

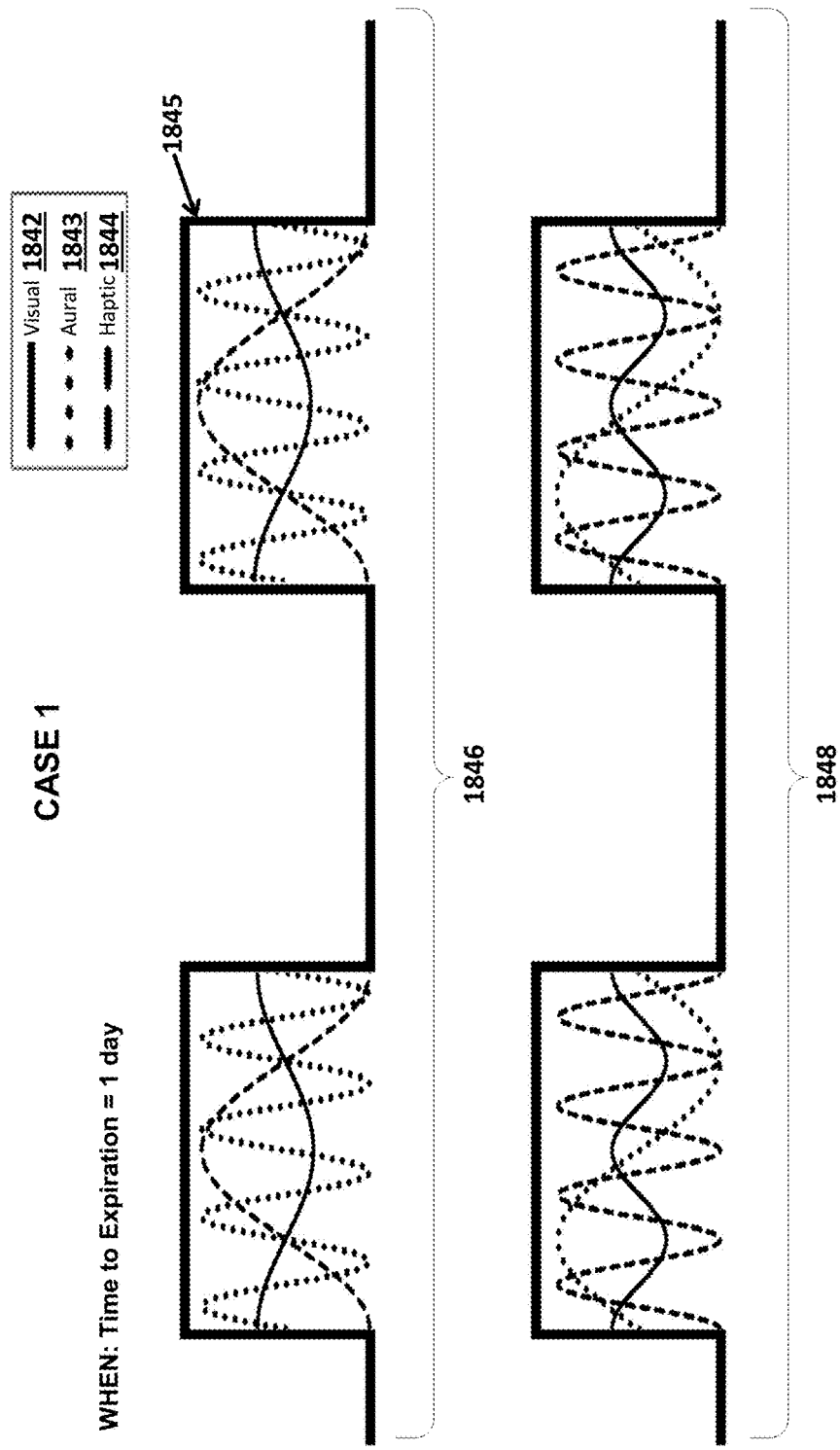

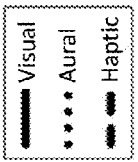
CASE 3
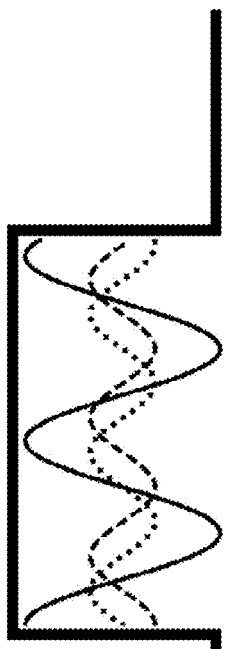
WHERE: Environment = Bright
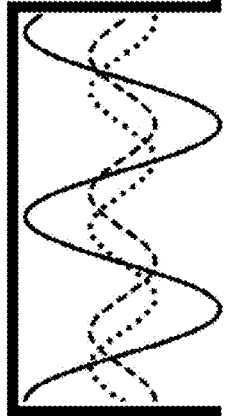
1866
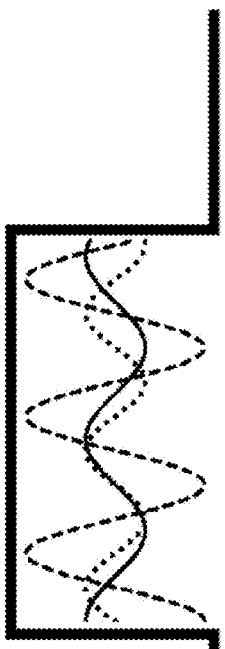
WHERE: Environment = Dark
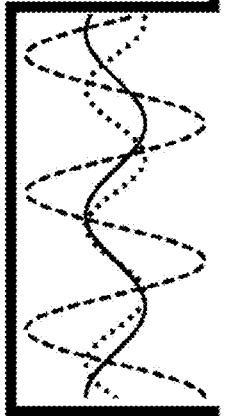
1868
FIG. 22

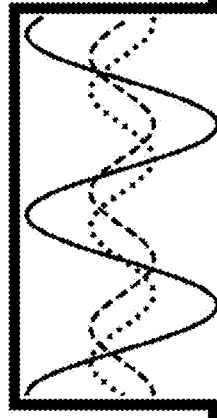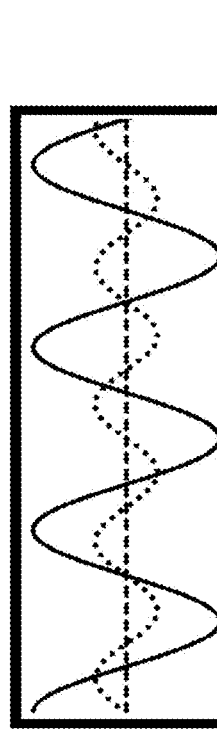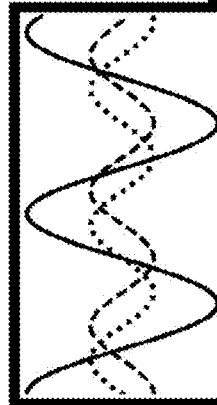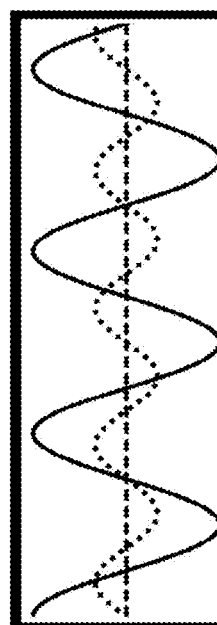
FIG. 23

CASE 5
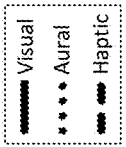
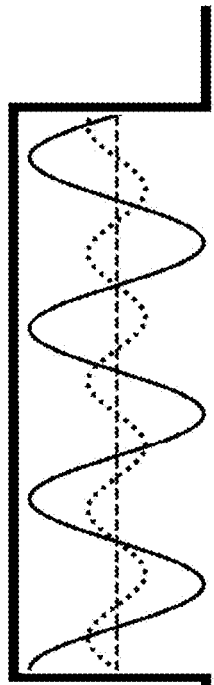
WHO: User= Mary
1886
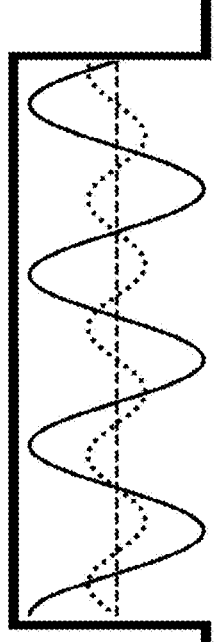
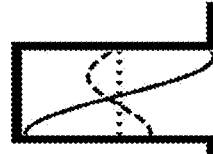
WHO: User= John
1888
FIG. 24

CASE 6
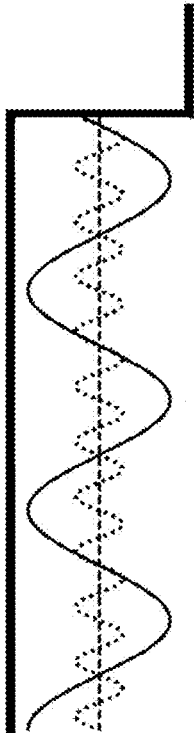
WHEN: Time to Expiration = 1 day
ADAPTIVE: Learning = A1
1896
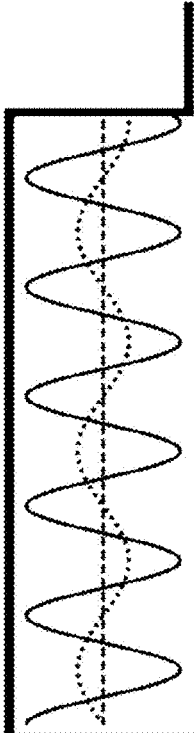
WHEN: Time to Expiration = 3 days
ADAPTIVE: Learning = A1
1898
FIG. 25

SYSTEMS, METHODS, AND APPARATUSES FOR TRACKING STATUS OF TIME-SENSITIVE ARTICLES

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

FIELD

The present application relates generally to networked devices for tracking and alerting to the status of time-sensitive objects, and to various systems and methods for the same.

BACKGROUND

Humans and animals often interact with time-sensitive objects, such as fresh or frozen fruits, vegetable, dairy products, breads, meat, poultry, seafood, baked goods and packaged goods with expiration dates, as well as fresh flowers, medicine, wine, kitty litter, tobacco, dry ice, baby food, mail, and parcels. When time-sensitive objects are forgotten, negative effects can occur such as spoilage, under-medication, missed deadlines, etc. Accordingly, systems, methods, and apparatuses for tracking status of time-sensitive objects are desired.

SUMMARY

Various implementations of systems, methods and devices within the scope of the appended claims each have several aspects, no single one of which is solely responsible for the desirable attributes described herein. Without limiting the scope of the appended claims, some features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the application provides a cueing device. The device is configured to alert a user to a perishable item associated with the cueing device based on one or more cueing parameters indicative of an urgency of the perishable item and a context for alerting the user to a status of the perishable item. The device includes a visual output capable of providing multiple levels of visual alert. The device further includes an input capable of receiving, from the user, an acknowledgement to an alert, or a cueing parameter. The device further includes one or more sensors configured to detect environmental characteristics affecting the perishable item. The device further includes a wireless communication interface.

In various embodiments, the perishable item can include a non-human object. In various embodiments, the device can further include an aural output capable of providing multiple levels of aural alert. In various embodiments, the device can further include a haptic output capable of providing multiple levels of haptic alert.

In various embodiments, the device can further include an attachment configured to physically associate the device with the perishable item. In various embodiments, the visual output can include one or more of: a monochrome or color light emitting diode (LED), a monochrome or color screen, and an electronic ink display. In various embodiments, the one or more sensors include one or more of: a touch pad, a button, a camera, an optical scanner, a microphone, an acceleration sensor, a geomagnetic sensor, a gyroscope, a temperature sensor, a humidity sensor, a pressure sensor, an ambient light sensor, a passive infrared motion sensor, a proximity sensor, an air quality sensor, and a spectrophotometric sensor.

Another aspect provides a method of contextual cueing. The method includes associating a time-sensitive object with a cueing device. The method further includes receiving an input indicating a cueing parameter. The method further includes determining cueing parameters indicative of an urgency of the time-sensitive object and an environmental context for alerting the user to a status of the time-sensitive object. The method further includes cueing the user based on the cueing parameters and environmental context.

In various embodiments, the cueing parameter includes one or more of: a type of reminder, a time to expiration, an environmental context for cueing, and a target user. In various embodiments, receiving the input can include receiving data entered into a mobile application, via wireless communication network. In various embodiments, said time-sensitive object can include one of: a food, a medication, a product to be acted upon, a product to be purchased, a product to be disposed, and an item to be delivered.

In various embodiments, said time-sensitive object a perishable item. In various embodiments, said associating can include one or more of: physical attachment and proximal association. In various embodiments, physical attachment can include one or more of: attaching with a magnet, a clip, a band, an adhesive, a fastener, a container, and a lid. In various embodiments, said determining cueing parameters can include automatically determining the cueing parameters of the time-sensitive object by performing a database lookup, via a wireless network, based on one or more of: a category, a name, a cost, a barcode, an image, a radio-frequency identification, a near-field communication, and a molecular structure of the time-sensitive object.

In various embodiments, said determining cueing parameters can include associating with the time-sensitive object, via a user input, at least one of one or more particular users to be cued to the time-sensitive object, one or more locations or environmental factors, wherein environmental factors include one or more of an environmental brightness level and an environmental loudness level, a time to expiration of the time-sensitive object, a type of alert to be used when cueing the user to the time-sensitive object, and one or more object names and/or descriptors, wherein descriptors include one or more of a label, picture, temperature, and message.

In various embodiments, determining the environmental context can include detecting, via one or more sensors, at least one of: a moisture level, an ambient light, a gas composition, a proximal motion, one or more sounds, detection of a face, surrounding object dimensions, angular momentum, a touch, acceleration, humidity, presence of a computing device, a distance to the time-sensitive object, a temperature, a thermal signature, and a magnetic field. In various embodiments, cueing the user can include selecting a cueing signal based on the cueing parameters and one or more behavioral factors. In various embodiments, the method can further include updating the cueing parameters based on a user acknowledgement or one or more behavioral factors.

In various embodiments, the cueing signal can include one or more of: a visual hue, an aural tone, and a haptic vibration frequency. In various embodiments, the method can further include varying a relative urgency as between each of the visual hue, aural tone, and haptic vibration frequency. In various embodiments, the one or more behavioral factors include one or more of: a user acknowledgment, historical success or failure of one or more cueing signals, a failsafe countdown timer and/or notification setting, and historical produce purchases.

In various embodiments, the method can further include receiving, from the user, an acknowledgement to a cueing signal, and recording at least one acknowledgement parameter. The at least one acknowledgement parameter can include: a time to respond, an agent of response, a method of response, a type of cueing signal acknowledged, a user identification, a user feedback, or a type of acknowledgement, or a combination thereof.

In various embodiments, the method can further include initiating one or more product purchases based on the at least one acknowledgement parameter. Initiating the product purchases can include one or more of: adding a product to an electronic shopping cart and authorizing payment for a product. In various embodiments, the method can further include providing information to the user based on the at least one acknowledgement parameter. Said information can include one or more of: user habits or patterns, qualitative suggestions, and quantitative suggestions.

Another aspect provides another a cueing device. The device includes at least one processor configured to associate a time-sensitive object with the cueing device. The processor is further configured to determine cueing parameters indicative of an urgency of the time-sensitive object and a context for alerting a user to a status of the time-sensitive object. The device further includes an output configured to cue the user based on the cueing parameters. The device includes an input configured to receive the cueing parameters from a user. The device further includes a wireless communication interface.

In various embodiments, the device can further include an attachment including one or more of: a magnet, a clip, a band, an adhesive, a fastener, a container, and a lid. In various embodiments, the device can further include a sensor including one or more of: a touch pad, a button, a camera, an optical scanner, a microphone, an acceleration sensor, a geomagnetic sensor, a gyroscope, a temperature sensor, a humidity sensor, a pressure sensor, an ambient light sensor, a passive infrared motion sensor, a proximity sensor, an air quality sensor, and a spectrophotometric sensor. In various embodiments, the output can include one or more of a display, a speaker, and a vibrator.

Another aspect provides a system configured to provide contextual cueing. The system includes a cueing device configured to cue, in the presence of a particular user, attention to a time-sensitive object physically associated with the cueing device, using a plurality of varying alert signals. The signals are based on a time until expiration of a time-sensitive object physically associated with the cueing device. The system further includes a hub device configured to provide a relay link to a communications network for obtaining instructions to the cueing device for when, how, who, or what to cue, and under which environmental circumstances.

BRIEF DESCRIPTION OF DRAWINGS

FIG. 5 illustrates various front facing functional elements of a hub device, according to an embodiment.

FIG. 6 illustrates various back facing functional elements of a hub device, according to an embodiment.

FIG. 7 illustrates exemplary placement of a hub device on a refrigerator.

FIG. 19A illustrates six use case examples that correspond to various cueing signals.

FIG. 19B illustrates an exemplary lookup table for determining the characteristics of cueing waveform signals, according to an embodiment.

FIG. 20 illustrates two example waveforms for Case 1 of FIG. 19A.

FIG. 22 illustrates two example waveforms for Case 3 of FIG. 19A.

FIG. 23 illustrates two example waveforms for Case 4 of FIG. 19A.

FIG. 24 illustrates two example waveforms for Case 5 of FIG. 19A.

FIG. 25 illustrates two example waveforms for Case 6 of FIG. 19A.

DETAILED DESCRIPTION

Various aspects of the novel systems, apparatuses, and methods are described more fully hereinafter with reference to the accompanying drawings. The teachings of this disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various novel aspects set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Several preferred embodiments are described herein that can alert or attract a user's attention through visual, aural and haptic cueing signals to specific objects, at specific times, in specific locations, and for specific users, wherein the form of the cueing signal is continually optimized to improve response rate for each user through a learning network.

Figure 1:
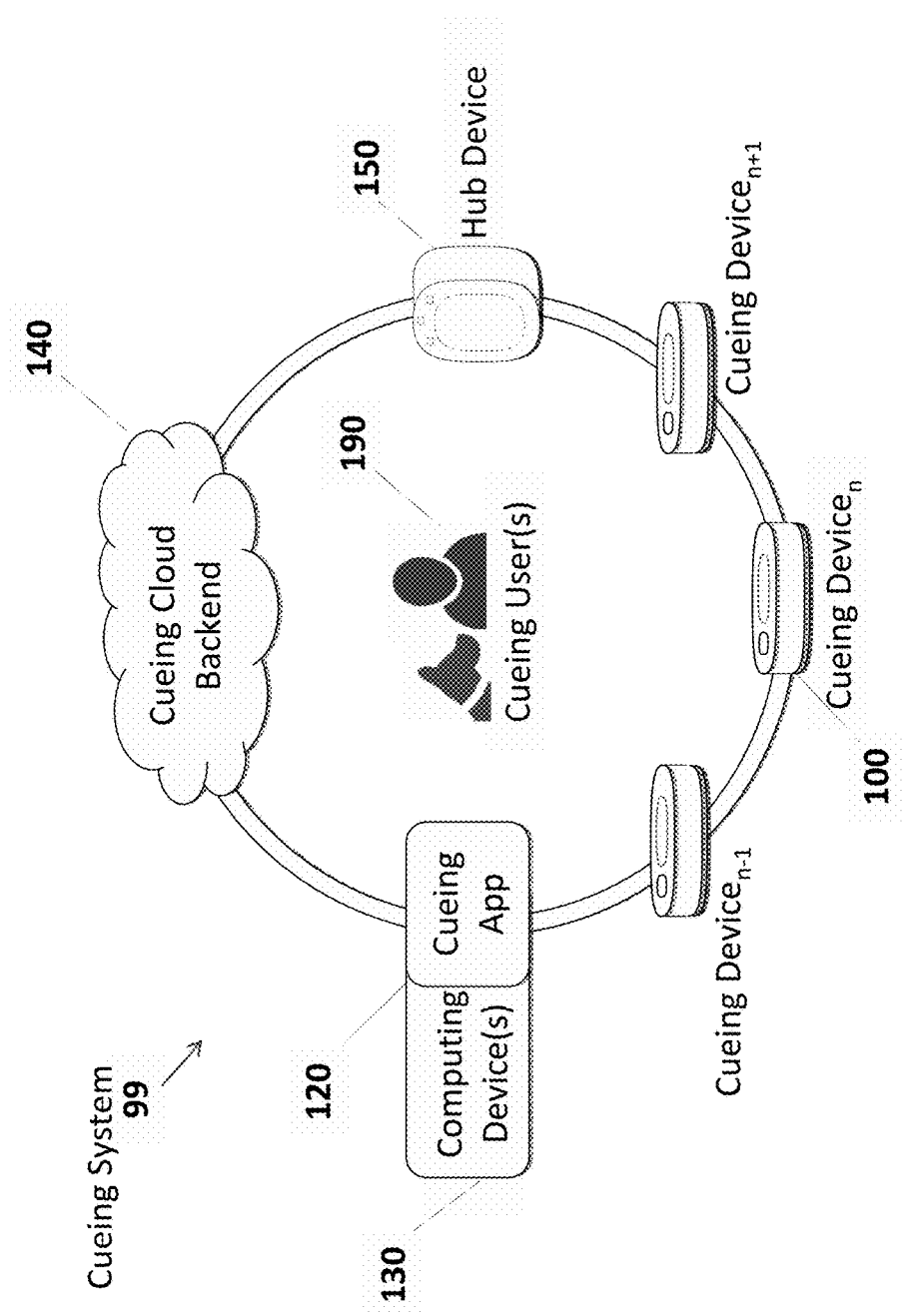
FIG. 1 illustrates an exemplary cueing system, according to an embodiment.

FIG. 1 illustrates the major components of the cueing system 99, herein referred to as the 'System', according to an embodiment. The system 99 includes representations of one or more users 190, which can be human, animal, or machine, which may use one or more cueing devices 100. Additionally, the system 99 can optionally also include one or more hub devices 150 and a cueing application 120 running on one or more internet capable computing devices 130, such as a laptop, a mobile smart phone (e.g., the iPhone™) or hub devices 150. The system 99 can further include a cueing cloud backend 140 such as, for example, a server configured to perform one or more processing steps discussed herein. Although the illustrated embodiment includes the elements configured as discussed herein, the elements can be rearranged or reconfigured, additional elements can be added, and elements can be omitted within the scope of this disclosure. For example, in some embodiments the system can omit a hub device, or be configured to offer the hub device as an option to facilitate data entry and central monitoring.

Figure 2C:
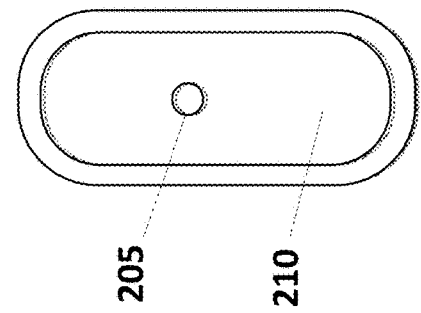
FIG. 2C illustrates various back-facing functional elements of a cueing device, according to an embodiment.
Figure 2A:
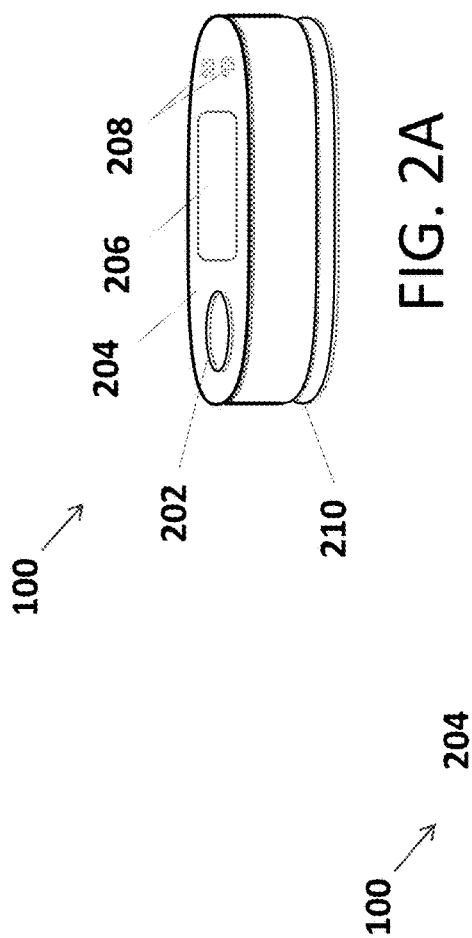
FIG. 2A illustrates various functional and interactive elements of a cueing device, according to an embodiment.
Figure 2B:
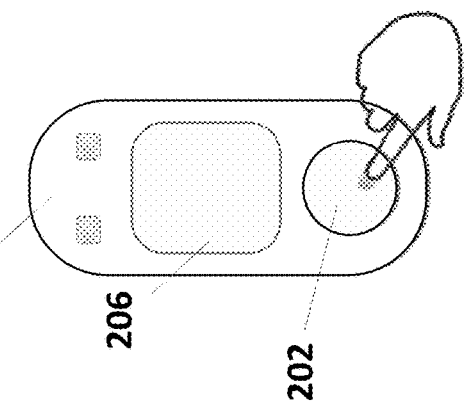
FIG. 2B illustrates an example of user interaction with a cueing device.

FIGS. 2A-2C illustrate the various functional elements of a cueing device 100, according to an embodiment. In various embodiments, a cueing device can refer to any device capable of drawing a user's attention through a change in output state for at least one sense (e.g., sight, hearing, taste, smell, and touch). Although the illustrated embodiment includes the elements configured as discussed herein, the elements can be rearranged or reconfigured, additional elements can be added, and elements can be omitted within the scope of this disclosure. An input 202 provides for a form of user 190 input such as a touch screen, touch surface or push button assembly. An output on an exterior surface 204 of the cueing device 100 can, for example, emit light that varies in color, intensity and/or pulse pattern, in order to effectively catch the attention of a user 190 through visual cueing. Those of skill in the art will appreciate that input 202 and output can be combined together, for example, in the form of a translucent surface with capacitive touch sensing capability.

In various embodiments, the output can include one or more of: visual, aural, and haptic output. For visual output, all or a portion of the exterior surface 204 can glow different colors via one or more LEDs. In an alternative embodiment, one or more discrete light point sources can also be used to collimate light rays for reflection against surrounding surfaces (e.g., the internal walls of a refrigerator) in order to further enhance the ability to attract the attention of user 190, as shown via rear LED 205 on the rear or attachment 210 surface in FIG. 2C. For aural output, a piezo or speaker element internal to the cueing device 100 can emit sounds through the exterior surface 204. For haptic output, a motor element internal to the cueing device 100 can create vibrations through the exterior surface 204. Another form of output 206 comprises a display that allows the cueing device 100 to display or otherwise provide status such as ambient temperature or real-time feedback to the user, such as when input 202 is interacted with to set or adjust days remaining for interaction with an associated time-sensitive object. Those of skill in the art will appreciate that input 202 and output 206 can be combined together, for example, in the form of a display with capacitive touch capability, where a discrete physical button for input 202 is not desired.

As used herein, time-sensitive objects can include, for example, any living (e.g., human or animal) or non-living object subject to expiration or other negative effects when not manipulated within a certain amount of time. Such negative effects can include, for example, spoilage, undermedication, missed deadlines, etc. Various examples of time-sensitive objects include, without limitation, fresh or frozen fruits, vegetable, dairy products, breads, meat, poultry, seafood, baked goods and packaged goods with expiration dates, as well as fresh flowers, medicine, wine, kitty litter, tobacco, dry ice, baby food, mail, and parcels.

As used herein, interaction with a time-sensitive object can include, but is not limited to, consuming, using, acting upon, mailing, delivering, disposing of, etc. In some embodiments, time-sensitive objects can include only non-human objects such as animals and inanimate objects. The output 206 can include a liquid crystal display ("LCD"), organic light emitting diode ("OLED"), active-matrix OLED ("AMOLED"), e-ink display, reflective, multi-segment display, light matrix, or any other form of information display or presentation. Various internal and/or external physical interfaces 208 expose various input and/or output ("I/O") components in the cueing device 100 to the surrounding environment such as, for example, a speaker for aural cueing and sensors such as temperature and ambient light for measuring the surrounding environment. An attachment 210 can include one or more user-detachable components that allow a cueing device 100 to be attached to various object types and containers, as will be described below with respect to FIG. 3A through FIG. 3F.

In a rectangular embodiment, the cueing device 100 can be between about 0.5 inch to 2.0 inches in width, 1.25 inches to 3.0 inches in length, and 0.1 inch to 1.5 inches in thickness; more particularly between about 0.8 inch to 1.5 inches in width, 1.75 inches to 2.5 inches in length, and 0.3 inches to 1.0 inches in thickness; and even more particularly between about 1.0 inch to 1.25 inches in width, 2.0 inches to 2.25 inches in length, and 0.5 inch to 0.75 inch in thickness. In a circular embodiment, the cueing device 100 can be between about 0.5 inch and 2.75 inches in diameter, more particularly between about 0.8 inch and 2.25 inches in diameter, and even more particularly between about 1.0 inch and 2.0 inches in diameter. The various diameters discussed herein can also refer to a maximum or average length or width for other geometric or non-geometric embodiments. In various embodiments, the cueing device 100 can be approximately the same dimensional and/or weight scale as the associated time-sensitive object, thereby facilitating physical association. For example, the cueing device 100 can be more than one hundredth the size of the associated time-sensitive object, more particularly more than one fiftieth the size of the associated time-sensitive object, and even more particularly, more than one tenth the size of the associated time-sensitive object. On the other end of the scale, the cueing device 100 may be slightly larger than the time-sensitive object, such as a pill box, but typically will be less than 10 times the size of the time-sensitive object. In some embodiments, the hub device 150 (FIG. 1) can have the same or similar dimensions as the cueing device 100, or in some embodiments can be larger.

Figure 3A:
FIG. 3A illustrates an example where a cueing device is placed next to a time-sensitive object.

FIGS. 3A through 3F illustrate several preferred embodiments showing how a cueing device 100 can be associated with or connected to physical objects of different types and geometries via proximity or various forms of the attachment 210. FIG. 3A depicts placing a cueing device 100 next to a physical product such as a medicine bottle 315 where, due to consistency of where the medicine bottle is regularly stored, placing a cueing device 100 in its vicinity suffices to make it contextually clear that the cueing device 100 and the medicine bottle are associated. In an alternative embodiment the cueing device 100 is adhered (e.g., with adhesive, Velcro™ or the suction cup 320 of FIG. 3B) to a surface, such as a wall or counter, near to where the object is regularly stored.

Figure 3B:
FIG. 3B illustrates an example where a cueing device is vacuum-attached to a time-sensitive object.
Figure 3C:
FIG. 3C illustrates an example where a cueing device is clipped to a time-sensitive object.
Figure 3D:
FIG. 3D illustrates an example where a cueing device is banded to a time-sensitive object.

FIG. 3B depicts connecting a cueing device 100 to a container 325 made of various compositions, such as plastic, glass or metal, for example a Tupperware™ container, via a vacuum such as suction cup attachment 320. FIG. 3C depicts use of a clip 330 that can hold a cueing device 100 and be snapped onto a bag or milk carton 335. FIG. 3D depicts an elastic band 340, designed to hold a cueing device 100, wherein the band can be placed around an object like a wine bottle 345.

Figure 3E:
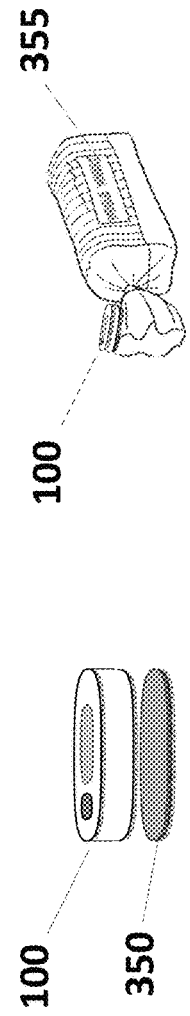
FIG. 3E illustrates an example where a cueing device is magnetically clipped to a time-sensitive object.

FIG. 3E depicts using a magnetic attachment 350, designed to hold a cueing device 100, wherein the attachment contains a magnet or ferrous material and the cueing device 100 contains a magnetic material with sufficient force (for example, about 5 m Tesla to about 1.25 Tesla) to pass through common paper bags, cardboard packaging, plastic lids, glassware, etc. and magnetically hold attachment 350, as depicted in FIG. 2E. In an alternative embodiment, the attachment 350 contains the magnetic material and cueing device 100 contains a magnetic or ferrous material.

Figure 3F:
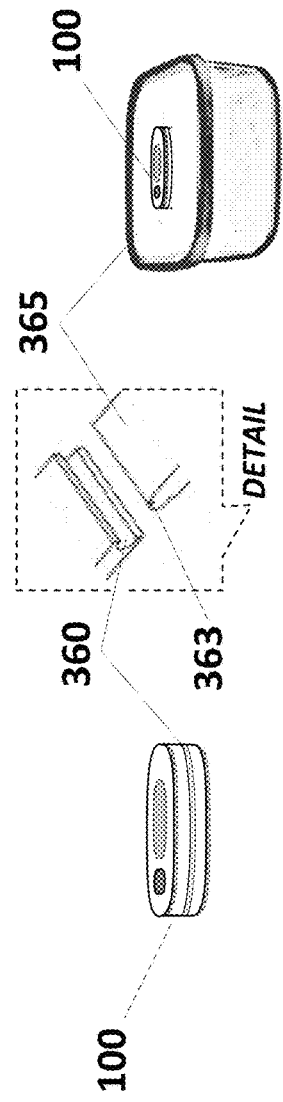
FIG. 3F illustrates an example where a cueing device is inserted into a time-sensitive object.

FIG. 3F depicts using a cueing device 100 with grove 360 that runs along its sides, allowing a consumer to slide it into and out of storage objects 365 that have been factory tooled with mating tongues 363, such as the lid of a reusable container. In an alternative embodiment, the groove is part of the object and tongue runs along the sides of cueing device. The above descriptions do not preclude use of more than one attachment at the same time, such as use of suction cup attachment 320 and elastic band 340 to associate cueing device 100 with a bottle 345. Further, the above descriptions do not preclude the attachment 210 from incorporating all of the means of association described herein, a subset of the means associated herein, just a single means, or none of the means (i.e., wherein cueing device 100 is just placed near a time sensitive object).

Figure 4:
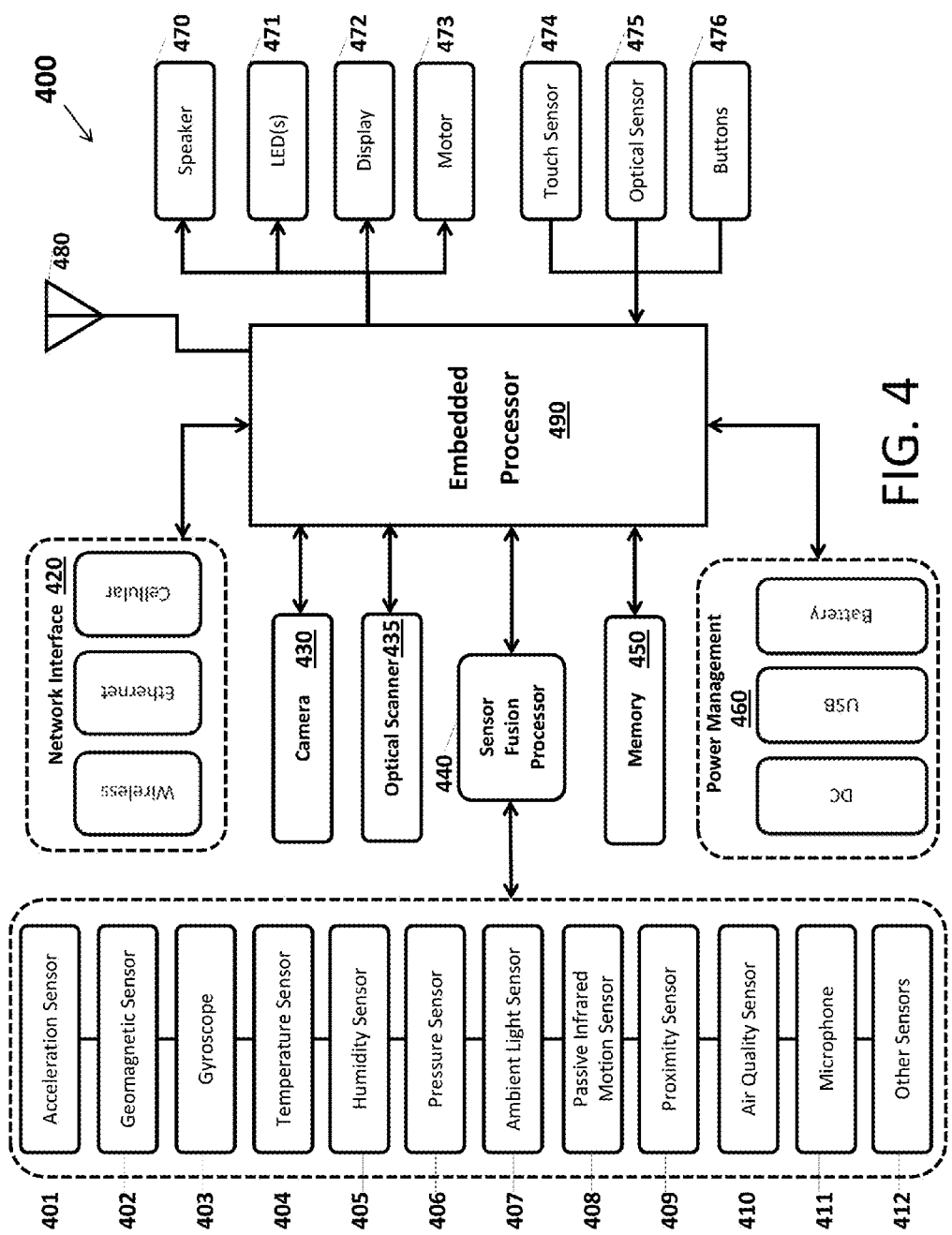
FIG. 4 illustrates a detailed system block diagram for the cueing device and hub device, according to an embodiment.

FIG. 4 illustrates a block diagram of a device 400 including various components 401-490, according to an embodiment. In various embodiments, the device 400 can represent a cueing device 100, a hub device 150, or any other device discussed herein. The block diagram includes an embedded Processor 490 which manages all of various Output units 470 through 473, Input Units 474 through 476 and individual sensors 401 through 412, and which performs various logic computations in association with memory unit 450. The processor 490 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The embedded processor 490 also communicates with the network interface 420, which enables one or more of the following means of communication: wireless (e.g., Wi-Fi, Bluetooth, Zigbee, etc.), Ethernet (e.g., wired LAN) and cellular via antenna 480. The embedded processor 490 and the elements associated with it are powered through a power management unit 460, for example via one or more of the following means of energy source: an alternating current ("AC") to direct current ("DC") transformer, a universal serial bus ("USB"), a disposable or rechargeable battery, which can be charged via wire or physical contacts using a charging station or through the air via wireless charging technology. The embedded processor 490 also communicates with a Camera 430 which in one preferred embodiment includes a high definition color and infrared camera, but which can also be of a lower resolution non-infrared monochrome or color type, or any other type. The embedded processor 490 can also communicate with an optical scanner 435 such as a bar code, QR, text, molecular or other analog to digital optical scanner. A sensor fusion processor 440 intelligently combines primary and derivative sensor data from individual sensors 401-412 for the purpose of improving application or system performance. The device (e.g., cueing device 100) can include one or more, particularly two or more, and preferably three or more of the following sensors: acceleration sensor 401, geomagnetic sensor 402, gyroscope 403, temperature sensor 404, humidity sensor 405, pressure sensor 406, ambient light sensor 407, passive infrared motion sensor 408, proximity sensor 409, air quality sensor 410, microphone 411, and other sensors 412. Sensor data is fused directly from a set of heterogeneous or homogeneous sensors, historical values of sensor data, indirectly using information sources such as a priori knowledge about the environment, and/or directly from human input. Combining data from multiple sensors allows not only correction for the deficiencies of individual sensors in order to improve the accuracy of data, but can also increase the intelligence of the overall system 99 (FIG. 1), in turn enabling the presentation of more meaningful and reliable contextual information to the user.

The device 400 can further include the antenna 480 and a network interface 420 as noted above. The network interface 420 can be configured to provide data communications, for example wirelessly via the antenna 480 or via a wired connection (not shown). In various embodiments, the network interface 420 can include one or more of a wireless interface, such as an 802.11 interface, a Bluetooth™ interface, an infrared interface, an Ethernet interface, a cellular interface, or any other communications interface. The network interface 420 can also include one or more transmitters, one or more receivers, one or more transceivers, and/or one or more antennas, which can be utilized during multiple-in/multiple-out ("MIMO") communications, for example.

The various components 401-490 can be coupled together by a bus system (not shown) and/or point-to-point connections. The bus system can include a data bus, for example, as well as a power bus, a control signal bus, and a status signal bus in addition to the data bus. Those of skill in the art will appreciate the components 401-490 can be coupled together or accept or provide inputs to each other using some other mechanism.

Although a number of separate components 401-490 are illustrated in FIG. 4, those of skill in the art will recognize that one or more of the components can be combined or commonly implemented. For example, the processor 490 can be used to implement not only the functionality described above with respect to the processor 490, but also to implement the functionality described above with respect to the sensor fusion processor 440. Further, each of the components illustrated in FIG. 4 can be implemented using a plurality of separate elements. Although the illustrated embodiment includes the elements configured as discussed herein, the elements can be rearranged or reconfigured, additional elements can be added, and elements can be omitted within the scope of this disclosure.

FIGS. 5 through 7 illustrate various elements of a hub device 150, according to an embodiment. FIG. 5 depicts a front perspective view of a hub device. In the illustrated embodiment, the hub device 150 includes a camera 520, which can include, for example, a black & white, color and/or infrared camera that can be used to capture images of (for example) products, barcodes, quick response ("QR") codes, object images, and/or faces for the purpose of performing face recognition.

An input 502 provides for a form of user input such as a touch screen, touch surface or push button assembly. An output 504 allows the hub device 150 to, for example, emit light that varies in color, intensity and/or pulse pattern via LEDs, in order to effectively catch the attention of a user 190 through visual cueing. Those of skill in the art will appreciate that input 502 and output 504 can be combined together, for example, in the form of an OLED screen with capacitive touch sensing capability. Various internal and/or external physical interfaces 508 expose various input and/or output ("I/O") components in a hub device 150 to the surrounding environment such as, for example, a speaker for aural cueing and a temperature sensor for measuring the surrounding environment.

FIG. 6 shows a rear view of the hub device 150, according to an embodiment. An attachment 510 can include one or more user-detachable components, such as magnet or adhesive strip, that allow a hub device 150 to be attached and/or detached to a refrigerator 560, as shown in FIG. 7, or alternatively be placed atop a countertop. The hub device 150, can optionally be run off an internal or external rechargeable battery 540 and/or alternatively be powered directly via an AC/DC wall-powered transformer.

Figure 8:
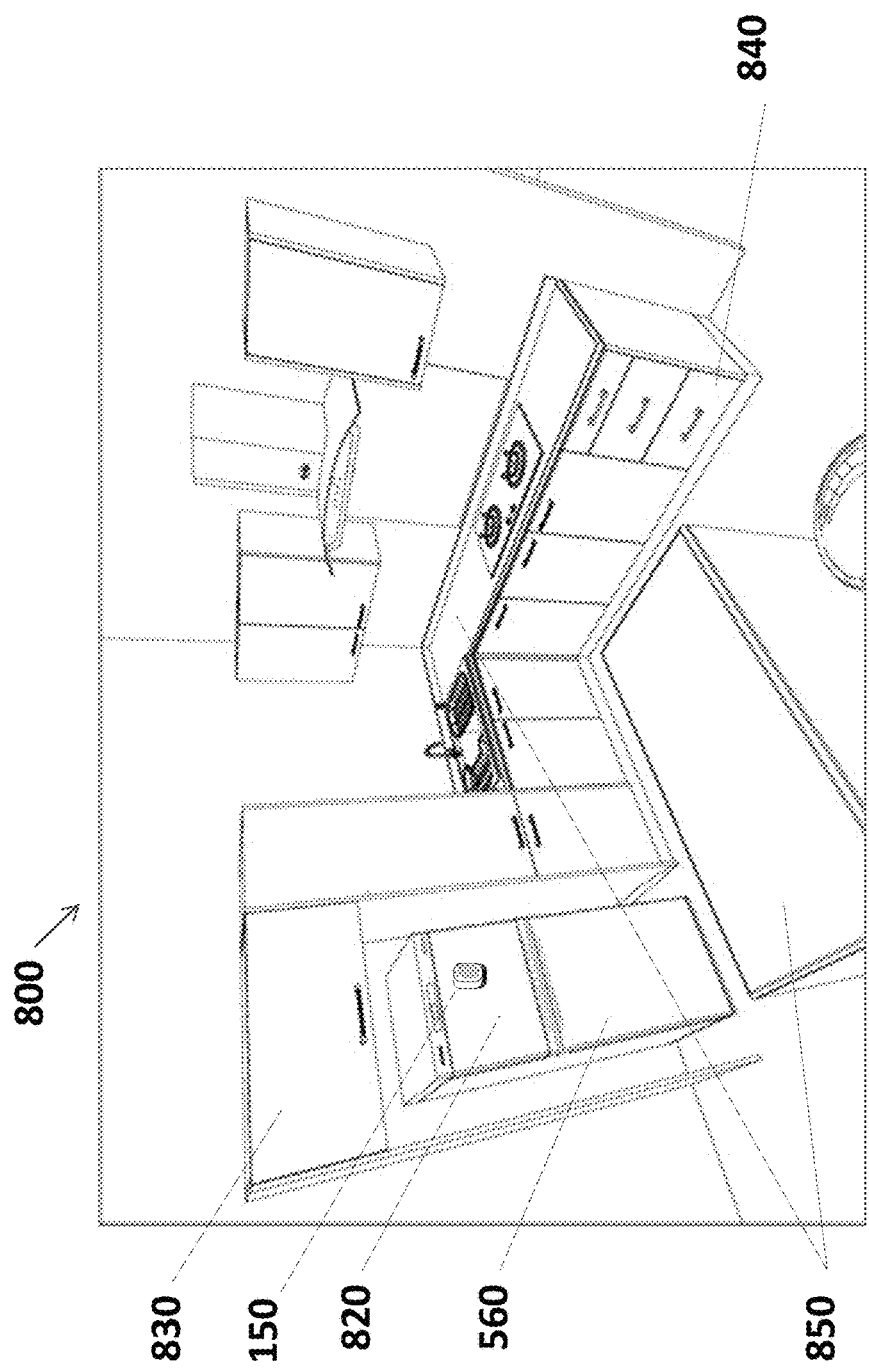
FIG. 8 illustrates an example room wherein the cueing system can be applied.

FIG. 8 illustrates an example room, such as a kitchen 800, where cueing devices 100 and a hub device 150 can be used in various embodiments. Specifically, cueing devices 100 can be used in the freezer 820, in the refrigerator 560, inside cabinets 830, inside drawers 840 or on countertops 850.

Figure 9:
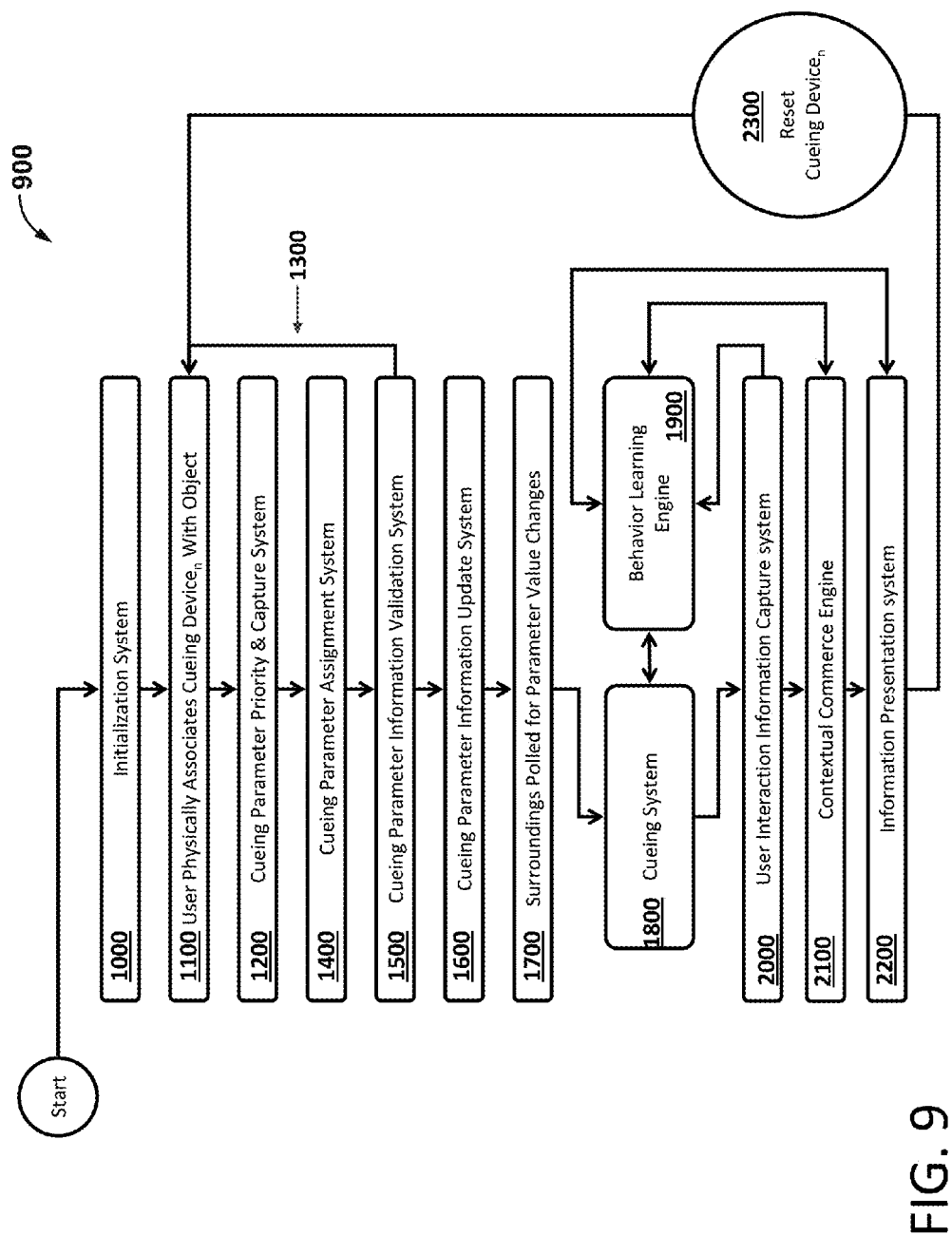
FIG. 9 illustrates an example system and user interaction process, according to an embodiment.

FIG. 9 illustrates a system and user 190 interaction process 900, according to an embodiment. In an embodiment, one or more blocks in process 900 can correspond to, or be performed by, a user, processor, and/or controller. Although the process 900 is described herein with reference to a particular order, in various embodiments, blocks herein can be performed in a different order, or omitted, and additional blocks can be added.

Figure 10:
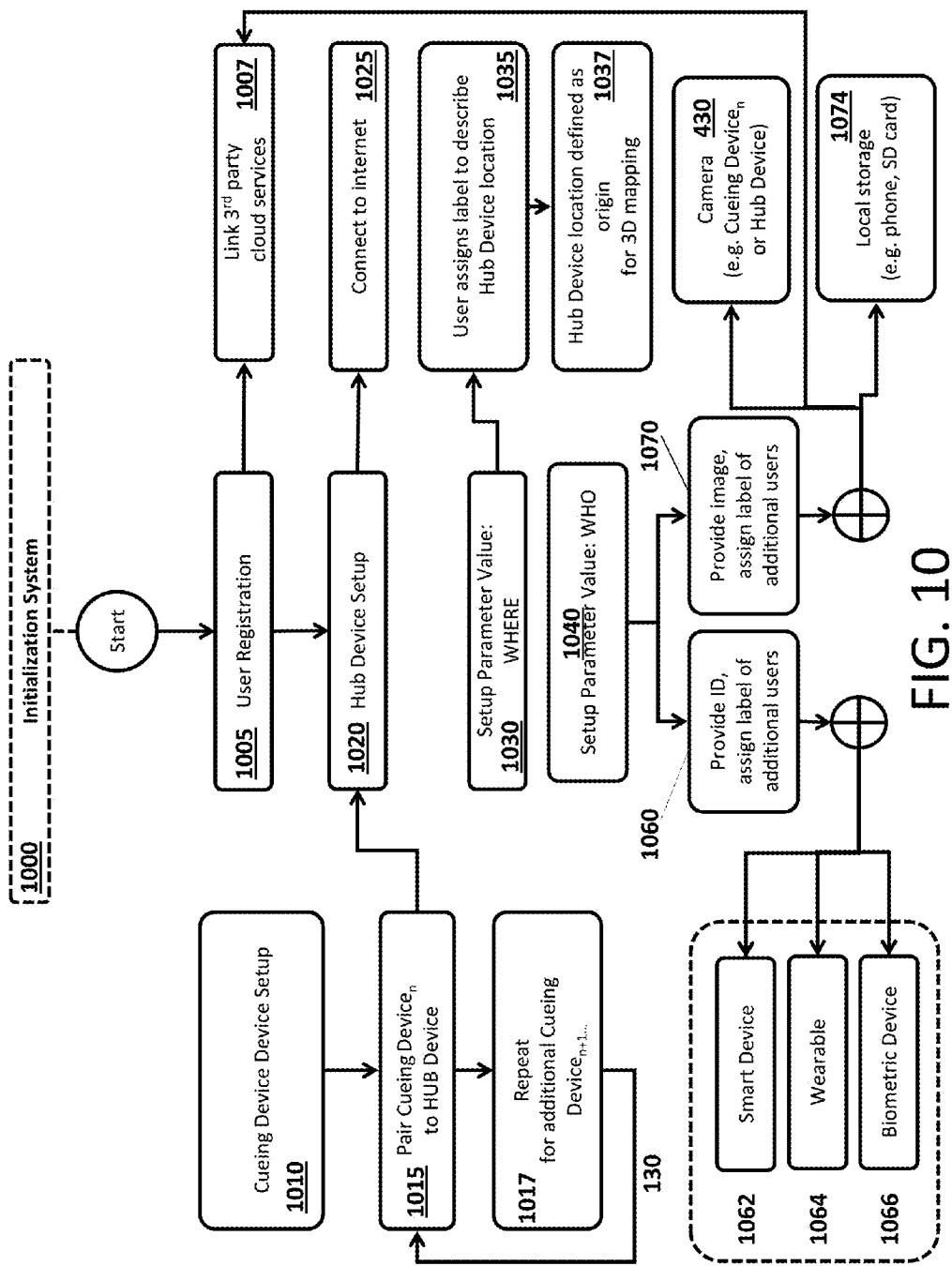
FIG. 10 illustrates a block diagram of a system and process of initializing the cueing system before first time use, according to an embodiment.
Figure 14:
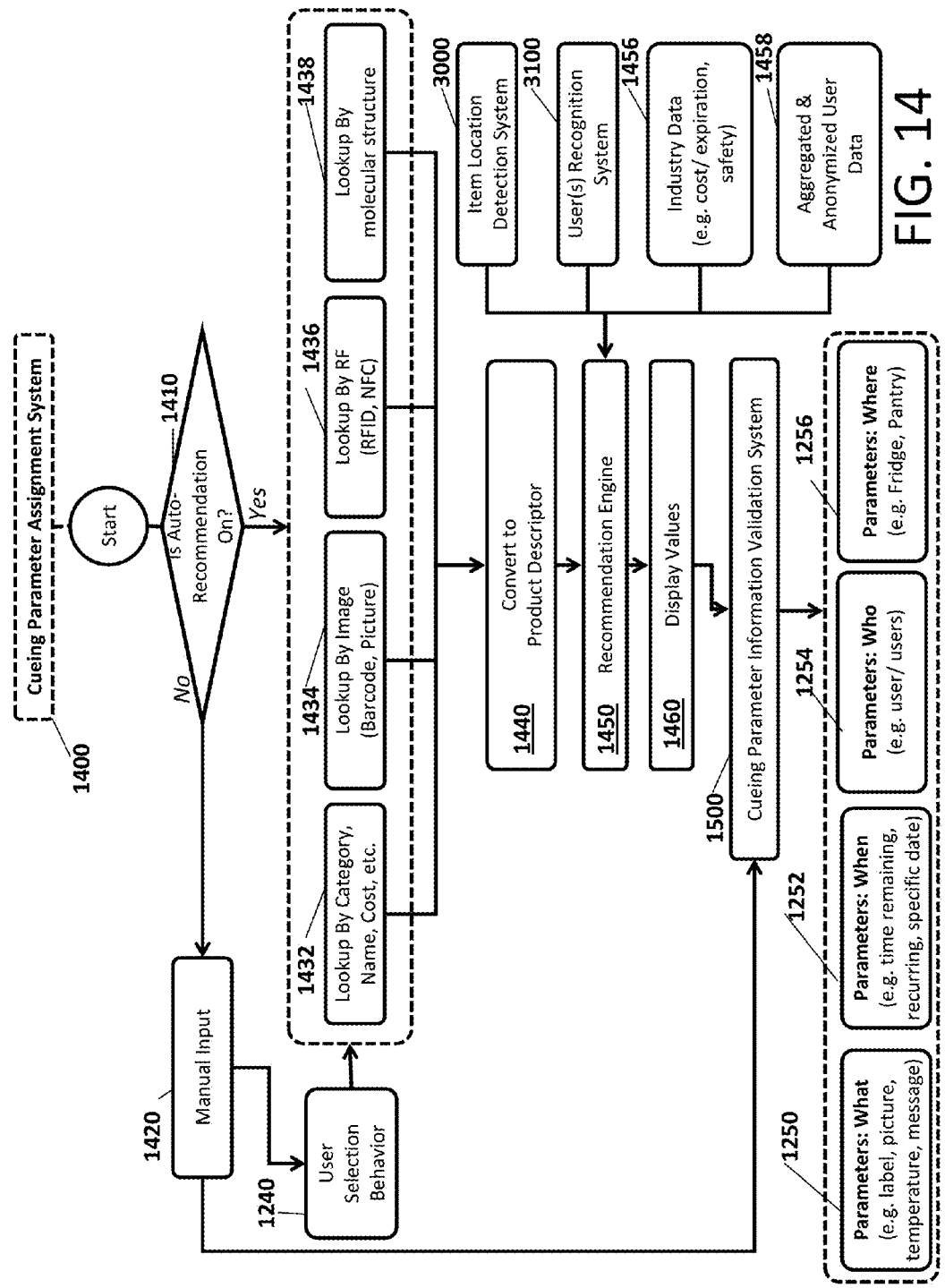
FIG. 14 illustrates a block diagram of a system and process of assigning values to cueing parameters, according to an embodiment.

The process 900 begins with initialization at block 1000, which is detailed in FIG. 10. At least one cueing device 100 is then associated at block 1100 with an object, as detailed in FIG. 11. Next, at least one cueing parameter, such as days remaining, is captured at block 1200 (FIG. 12), assigned at block 1400 (FIG. 14), and validated at block 1500 (FIG. 14). Additional cueing devices 100 can then, optionally, be associated, captured and assigned through an iterative feedback loop as indicated by reference 1300. All cueing device(s) 100, hub device(s) 150, the cueing cloud backend 140, and associated third party computing device(s) 130 are then updated, at block 1600, with the new, edited or deleted information from the preceding steps, as detailed in FIG. 16. The surroundings are then polled for changes, at block 1700, relative to the assigned parameter values, as detailed in FIG. 17. When a polled value meets or exceeds the threshold value of its corresponding parameter, the system 99 then initiates one or more cueing signals, at block 1800, to attract the attention of one or more intended users, as detailed in FIG. 18. The characteristics of each cueing signal are preferably further refined based on past interactions and behavior patterns as analyzed via a Behavior Learning Engine, at block 1900, as detailed in FIG. 26. Acknowledgement, or lack thereof, by the user 190 is tracked through the interaction information capture system, at block 2000, in addition to related parameters, such as the method of response (e.g., a hand wave), which also feedback into refining the learning model at block 1900, as detailed in FIG. 26. The type of acknowledgement can also be used to initiate purchases, at block 2100 that relate to the object being tracked, as detailed in FIG. 28. Finally, various forms of useful information such as status, patterns and/or suggestions are provided to the user 190 via the Information Presentation system at block 2200, as detailed in FIG. 29. Blocks 2100 and 2200 can include two-way feedback with the Behavior Learning Engine 1900 to continually optimize and personalize the user 190 experience. After a cueing device 100 has completed its cueing task, or at any time beforehand, it can be reset at block 2300, for example explicitly by the user 190 and/or implicitly by the system 99 based on learning model of block 1900 so it can be used again.

FIG. 10 is a block diagram illustrating a system and process 1000 of initializing the system 99 before first time use, according to some embodiments. In an embodiment, one or more blocks in process 1000 can correspond to, or be performed by, a user, processor, mobile device, and/or controller. Although the process 1000 is described herein with reference to a particular order, in various embodiments, blocks herein can be performed in a different order, or omitted, and additional blocks can be added.

One outcome of this process can include making all users, cueing devices 110, and hub device 150 devices known to the system 99, and to each other. Users and devices not available at the time of block 1000 can be added at any subsequent time. The process begins with registration by user 190 at block 1005 via a cueing application 120, the display 472, or the speaker 470 on a cueing device 100 or hub device 150, wherein the user 190 provides demographic information such as name, email, picture, etc. In addition, the user 190 can choose to link the system 99 to third party cloud services at block 1007 for the purpose of connecting with third party devices (e.g., wearable watches), inviting others to join the system 99, and sharing information.

Next, at block 1020, setup for the hub device 150 involves connecting it to a local or wide-area network (e.g., the Internet) at block 1025, e.g., via Wi-Fi™. Setup at block 1010 for each cueing device 100 can include pairing, at block 1015, each cueing device 100 with the system 99, for example using a standard wireless protocol such as Bluetooth™. In a preferred embodiment, blocks 1010 through 1017 are completed at the factory. If not completed at the factory, or upon adding additional cueing devices 100 to the system 99, users 190 are guided through blocks 1010 through 1017, for example via the application 120, the display 472, or the speaker 470 on a cueing device 100 or hub device 150.

At block 1030, the user 190 is provided with the option to inform the system 99 where the hub device 150 is located in the home or business, selecting or giving it a label such as "Kitchen" at block 1035. One benefit of block 1035 is that, at block 1037, an origin point can be defined in 3D space (0,0,0), from which the vector distance to all cueing devices 100 and users 190 can subsequently be measured.

At block 1040, the system 99 is made aware of additional users 190 who will be interacting with it in at least one of two ways. One way is depicted via block 1060, wherein the system 99 is provided with the unique identifiers ("IDs") and corresponding names of users 190 via one or more computing devices 130, that can include but are not limited to a smart device 1062, such as a smart phone or tablet, wearable device 1064, biometric device 1066, or other personal computing device 130. A second way is depicted via block 1070, wherein the system 99 is provided with pictures of faces and corresponding names of users 190 via one or more of the following methods: camera 430, local storage 1074, or third party cloud services 1007.

Figure 11:
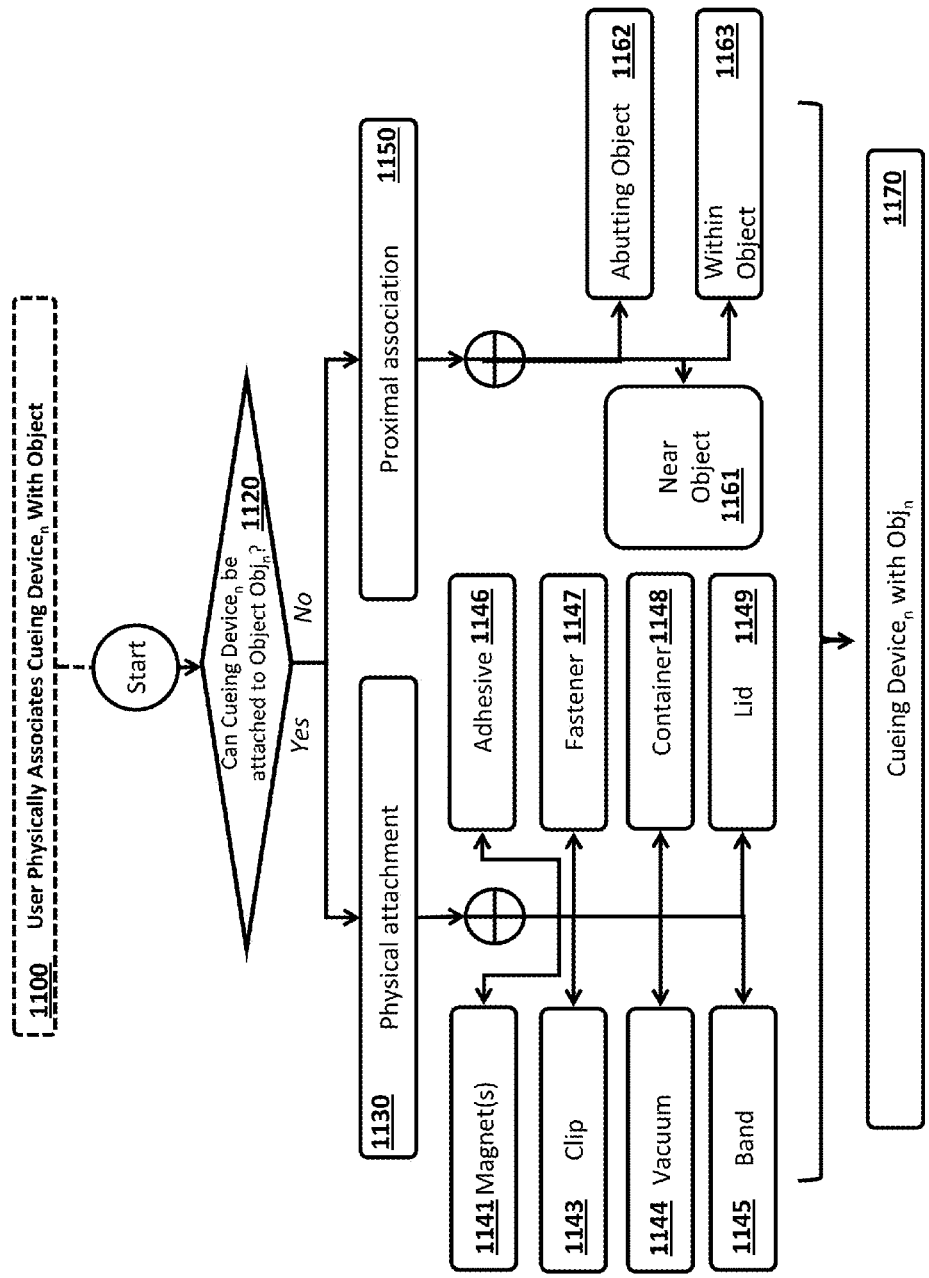
FIG. 11 illustrates a block diagram of a system and process of associating a cueing device with any physical object, according to an embodiment.

FIG. 11 is a block diagram illustrating a system and process 1100 of associating a cueing device 100 with an effectively unlimited number of different physical object types, shapes, sizes, materials, etc., according to some embodiments. As shown at block 1170, the association of the process 1100 can be repeatedly performed between any number of objects and any number of cueing devices 100. In various embodiments, objects can be broadly organized at decision block 1120 into two groups for use with the system 99: physical attachment 1130 or proximal association 1150. In an embodiment, one or more blocks in process 1100 can correspond to, or be performed by, a user, processor, and/or controller. Although the process 1100 is described herein with reference to a particular order, in various embodiments, blocks herein can be performed in a different order, or omitted, and additional blocks can be added.

In the first group at block 1130, a user 190 can physically attach a cueing device 100 to an object, for example via static or electro-magnetic force at block 1141, mechanical spring force at block 1143, vacuum force at block 1144, elastic band force at block 1145, adhesive force at block 1146, which can be either permanent or temporary, or fastener force (e.g., Velcro™) at block 1147. In addition a cueing device 100 can be permanently fashioned into a container at block 1148 at the point of manufacture or designed in such a way that it is either permanently built into or made to be detachable from the lid of a container at block 1149. Physical attachment techniques of blocks 1141 through 1149 have been found to cover most physical attachment needs but other attachment techniques exist as well.

In the second group at block 1150, a user 190 can proximally associate a cueing device 100 to an object, for example by placing it in the vicinity of, or near, an object at block 1161, or abutted beside an object at block 1162. An example includes placing a cueing device 100 on a countertop close to or beside an important package that should be mailed before a certain time. Additionally, the cueing device 100 can be placed within an object at block 1163, such as placing a food safe and waterproof version of the cueing device 100 into a container of leftover food. In various embodiments, "proximal" can include any degree of proximity to the associated object sufficient for a user to detect a cue from the cueing device when adjacent to the time-sensitive object.

In various embodiments, a device (such as, for example, the device 400 of FIG. 4) can logically associate (as opposed to, or in addition to physically associating) a time-sensitive object with a cueing device. For example, a processor such as the processor 490 (FIG. 4) can store a representation of the time-sensitive object in a memory such as the memory 450 (FIG. 4). Such representation can include, for example, a text description, nickname, one or more cueing parameters, such as an expiration date, or any other data representation. The processor 490 can further store a representation of a cueing device 100 in the memory 450. Such representation can include, for example, a string hash, nickname, globally unique identifier (GUID), or any other data representation. The processor 490 can further associate, in memory 450, the representation of the time-sensitive object with the representation of the associated cueing device. In various embodiments, the device 400 performing the association can be the associated cueing device 100 (FIG. 1) itself, the hub device 150 (FIG. 1), or any other device in the cueing system 99 (FIG. 1) including remote server processing.

Figure 12:
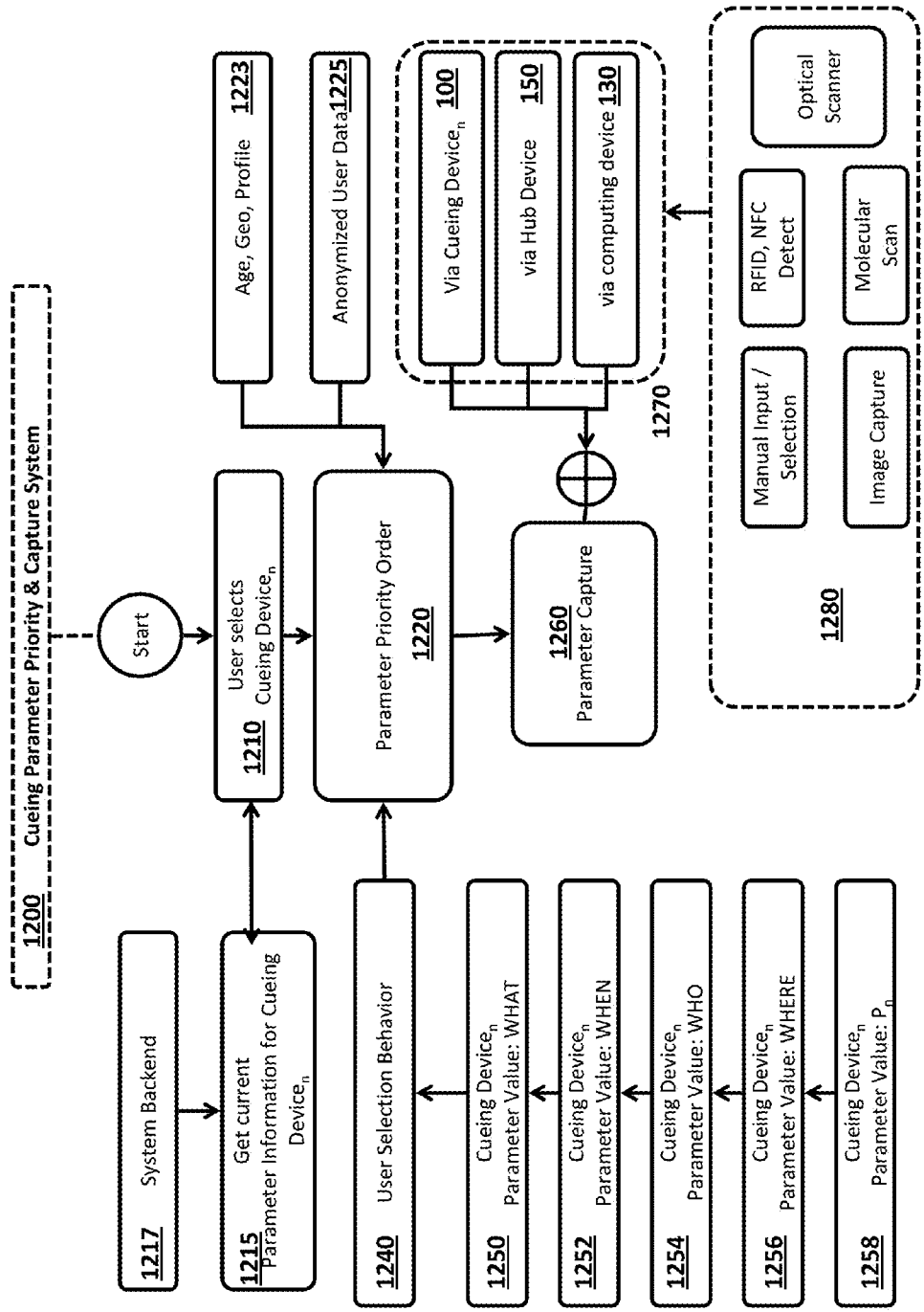
FIG. 12 illustrates a block diagram of a system and process of prioritizing and capturing cueing parameters, according to an embodiment.

FIG. 12 is a block diagram illustrating a system and process 1200 of ordering, presenting and capturing one or more cueing parameters, according to some embodiments. In an embodiment, one or more blocks in process 1200 can correspond to, or be performed by, a user, processor, and/or controller. Although the process 1200 is described herein with reference to a particular order, in various embodiments, blocks herein can be performed in a different order, or omitted, and additional blocks can be added.

Cueing parameters 1250-1258 can include, for example, a 'WHAT' parameter 1250 (which can indicate a type of time-sensitive object), a 'WHEN' parameter 1252 (which can indicate a time value or urgency for the time-sensitive object), a 'WHO' parameter 1254 (which can indicate a user for which the time-sensitive object is relevant), a 'WHERE' parameter 1256 (which can indicate one or more locations for the time-sensitive object), and one or more other parameters 'Pn' 1258 (which can indicate, for example, the cost or price of the time-sensitive object). In various embodiments, the cueing parameters 1250-1258 can provide context for circumstances in which cueing should be employed.

In the illustrated embodiment, the process 1200 is initiated by a user 190 selecting a cueing device 100 at block 1210. The cueing device 100 can be selected, for example, through physical interaction or by virtually selecting it via a cueing application. If there is physical interaction, the system can automatically identify the cueing device 100 that has been tapped or picked up via internal sensors, such as an internal accelerometer 401 (FIG. 4). If the cueing device 100 is in active use, current cueing parameter information, that is already associated with that cueing device 100, is obtained at block 1215 from the system backend 1217, e.g., through the network. When the system 99 is being used for the first several times, the cueing parameter priority is informed by the user's demographic information at block 1223, and/or anonymized data from users 190 of other instances of the system 99 at block 1225. Over time, parameter priority order is optimized at block 1220 based on the user's own behavior and interaction with the system 99 at block 1240. Specifically, as there are multiple cueing parameters 1250-1258, it is preferable to prioritize the presentation of them in order to simplify the user experience both on a given device and across devices. For example, if it is known who the user 190 is via their smart device or the hub device 150, then that user 190 can be automatically assigned as the default 'WHO' parameter value 1254 so that other parameters could be presented more prominently. Further, if a user 190 typically assigns the 'WHAT' parameter value 1250 by always taking a picture of the object with their smart device or hub device 150, then that 'WHAT' parameter value can be presented more prominently than other cueing parameters in the cueing application running on that same smart device, by way of example. Additional parameters can also include the 'WHERE' parameter value 1256 or still other parameter values Pn 1258, such as the cost or price of the time-sensitive object.

Upon choosing a cueing parameter to define, the user 190 then initiates capture, at block 1260, of information for that cueing parameter using one of the many standard human-computer interface techniques 1280 (including, for example, manual input and/or selection, resource interchange format near-field communications detection, image capture, bar code, QR, text, molecular scan, etc.). For example, the user 190 can take a picture of the object to define parameter value 'WHAT' 1250, and the system 99 can associate the expiration time of\ an object tracked with a cueing device 100 with a picture of that object. The system 99 can support presenting different cueing parameter values across different hardware devices and software interfaces 1270 and in turn capturing values for those cueing parameters across still other hardware devices and software interfaces.

Figure 13:
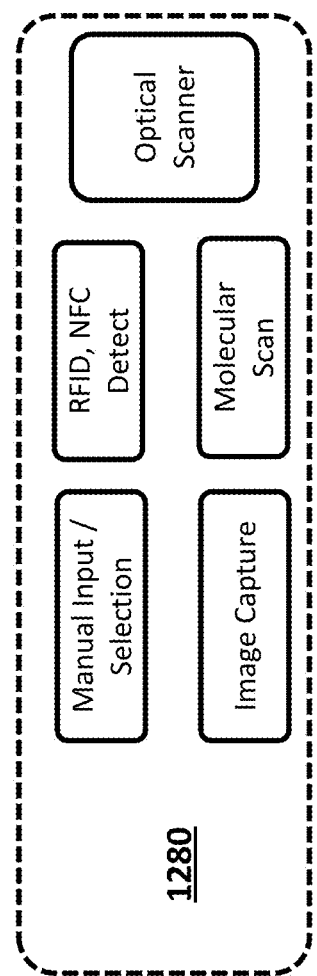
FIG. 13 is an enlarged view of various human-computer interface techniques shown in FIG. 12.

FIG. 13 is an enlarged view of various human-computer interface techniques 1280 shown in FIG. 12.

FIG. 14 is a block diagram illustrating a system and process 1400 of assigning values to the cueing parameters, according to some embodiments. In an embodiment, one or more blocks in process 1400 can correspond to, or be performed by, a user, processor, and/or controller. Although the process 1400 is described herein with reference to a particular order, in various embodiments, blocks herein can be performed in a different order, or omitted, and additional blocks can be added.

As the system 99 is a learning system, it has the ability to make recommendations based on past behavior of a user 190, as well as based on the aggregated behavior of similar users 190 through cohort demographics such as age, geography, cueing interactions. If recommendations are turned on at block 1410, then the captured cueing parameter values 1260 (FIG. 12) are passed to one or more databases, at blocks 1432 through 1438, for lookup, based on the type of capture information. In one embodiment, if the image the user 190 captured with their smart device was that of a product barcode, then that barcode image would be looked up in a product barcode database at block 1434, wherein the query would return a product descriptor value at block 1440 to identity the product. Similar techniques include looking up a product by its manufacturer-supplied radio frequency identification (RFID) and/or near-field communication (NFC) tag at block 1436, or looking up a food product that is manufactured or cooked at home via a spectrophotometric scan of the food, at block 1438, wherein the molecular constituents of the food can be analyzed. The descriptor value is then passed to the recommendation engine at block 1450, wherein it is matched to the same or similar products to obtain suggested cueing parameter value information. The suggested cueing parameter values can be informed by one or more techniques such as, but not limited to: past activities in a specific location of the object at block 3000, the past behavior and preferences of specific users 190 interacting with the object at block 3100, industry data 1456 such as U.S. Food and Drug Administration (FDA) or other recommendations for optimal temperatures to refrigerate meats and or aggregated user 190 interaction and preference data at block 1458 from similar users 190 of the system 99. After processing by the recommendation engine at block 1450, the recommendation is then presented to the user at block 1460, wherein the user 190 can validate, e.g., choose to accept, edit, or delete, the recommendation at block 1500. In an embodiment, if recommendations are not active at block 1410, then a user 190 can choose to manually input, at block 1420, a value such as inputting, via text or voice, the name of a specific product or time remaining value. To speed manual entry, past entries and selections that contextually match what the user 190 is inputting are automatically suggested at block 1240.

In various embodiments, a device (such as, for example, the device 400 of FIG. 4) can determine cueing parameters indicative of an urgency of the time-sensitive object. For example, a processor such as the processor 490 (FIG. 4) can determine the 'WHEN' parameter 1252 (FIG. 12) as discussed above with respect to the cueing parameter assignment system 1400. The processor 490 can further determine a context for alerting a user to a status of the time-sensitive object. In some embodiments, the context can include any combination of queuing parameters 1250-1258. In various embodiments, the device 400 determining the association can be the associated cueing device 100 (FIG. 1) itself, the hub device 150 (FIG. 1), or any other device in the cueing system 99 (FIG. 1), including remote server processing.

Figure 15A:
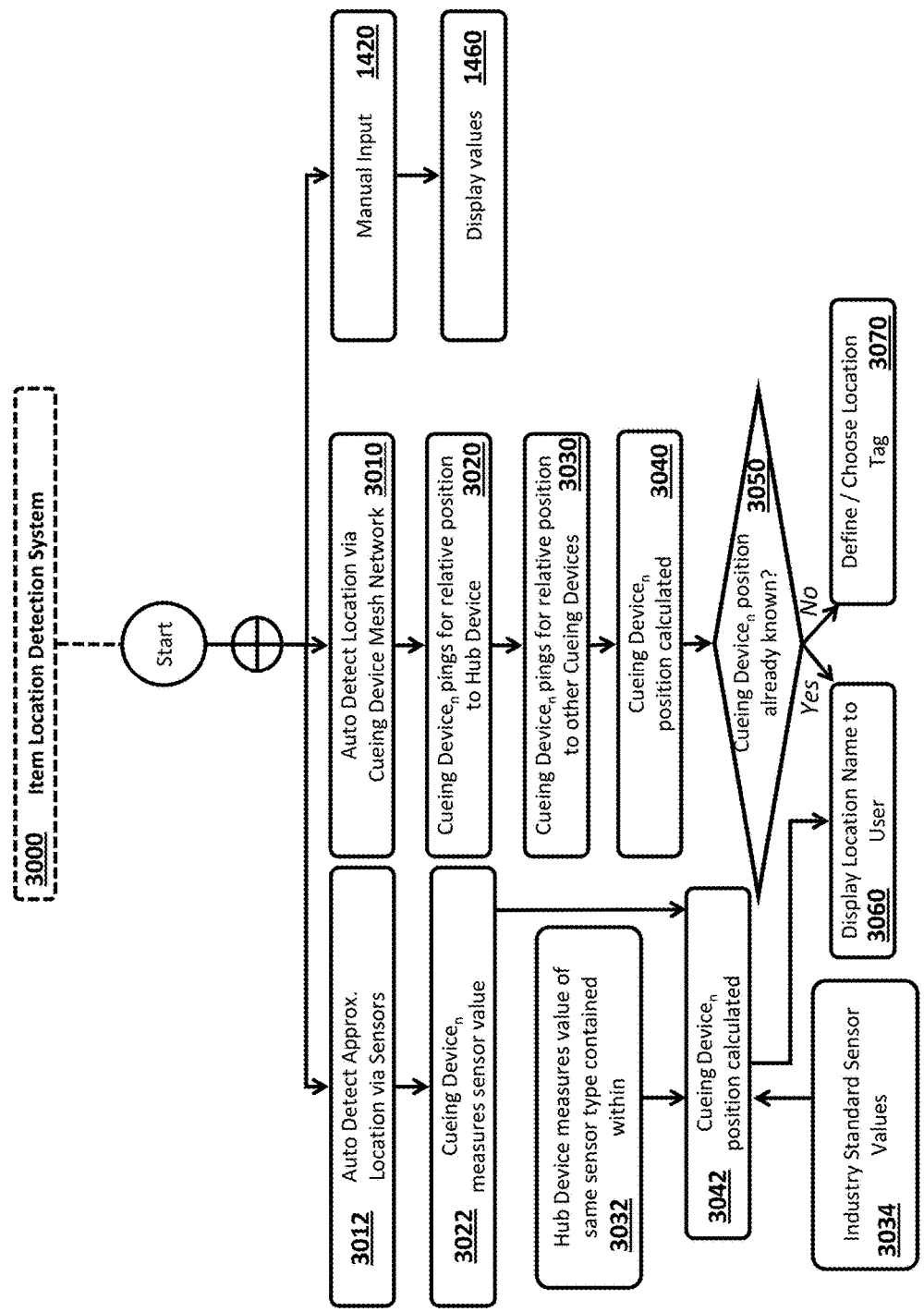
FIG. 15A illustrates a block diagram of a system and process of determining the location of a cueing device in an environment, according to an embodiment.

FIG. 15A is a block diagram illustrating a system and process 3000 of determining the location of a cueing device 100 in an environment, according to some embodiments. In an embodiment, one or more blocks in process 3000 can correspond to, or be performed by, a user, processor, and/or controller. Although the process 3000 is described herein with reference to a particular order, in various embodiments, blocks herein can be performed in a different order, or omitted, and additional blocks can be added.

In the illustrated embodiment, approximate location of a cueing device 100 is automatically detected at block 3012 using sensors (e.g., temperature, light, field strength, etc.). In an embodiment, the sensor value of each cueing device 100 is measured via its internal sensor at block 3022. Sensor data from each cueing device 100 are compared to each other and compared to industry standard values 3034 at block 3042 to determine approximate location. For example, it is an industry standard value that the average internal temperature of a freezer is approximately 0 degrees Fahrenheit and the average internal temperature of the refrigerator portion is approximately 32 degrees Fahrenheit. For greater accuracy, the surrounding ambient room temperature of each hub device 150 can also be measured via internal temperature sensors 3032 and inputted to block 3042.

In yet another embodiment, the hub device 150 pings for active cueing devices 100 at block 3020 and each cueing device 100 also pings out to all area active cueing devices 100, at block 3030, for example via mesh network communication protocols 3010. The approximate location of a given cueing device 100 is calculated dynamically, applying one of several triangulating algorithm techniques to measure the distance between all responding cueing devices 100 in the mesh network and the distance relative to the hub device 150, which has been established as the (0,0,0) origin in block 1037 (FIG. 10). If the position is already known, at block 3050, to the system 99, a corresponding label (such as "Pantry") is returned to the user at block 3060. However, if the position is not already known, then the user 190 is given the option to apply a descriptive label at block 3070, so that it can be used to describe that location in a meaningful way in the future when a cueing device 100 is found to be in that location. Alternatively, if the system 99 does not have the capability to automatically detect locations, at block 3010, for example in an embodiment wherein a user 190 is only using cueing devices 100 without a hub device 150, then the user 190 can manually enter a location description at block 1420 (e.g., Freezer) or choose from recent values at block 1460.

Figure 15B:
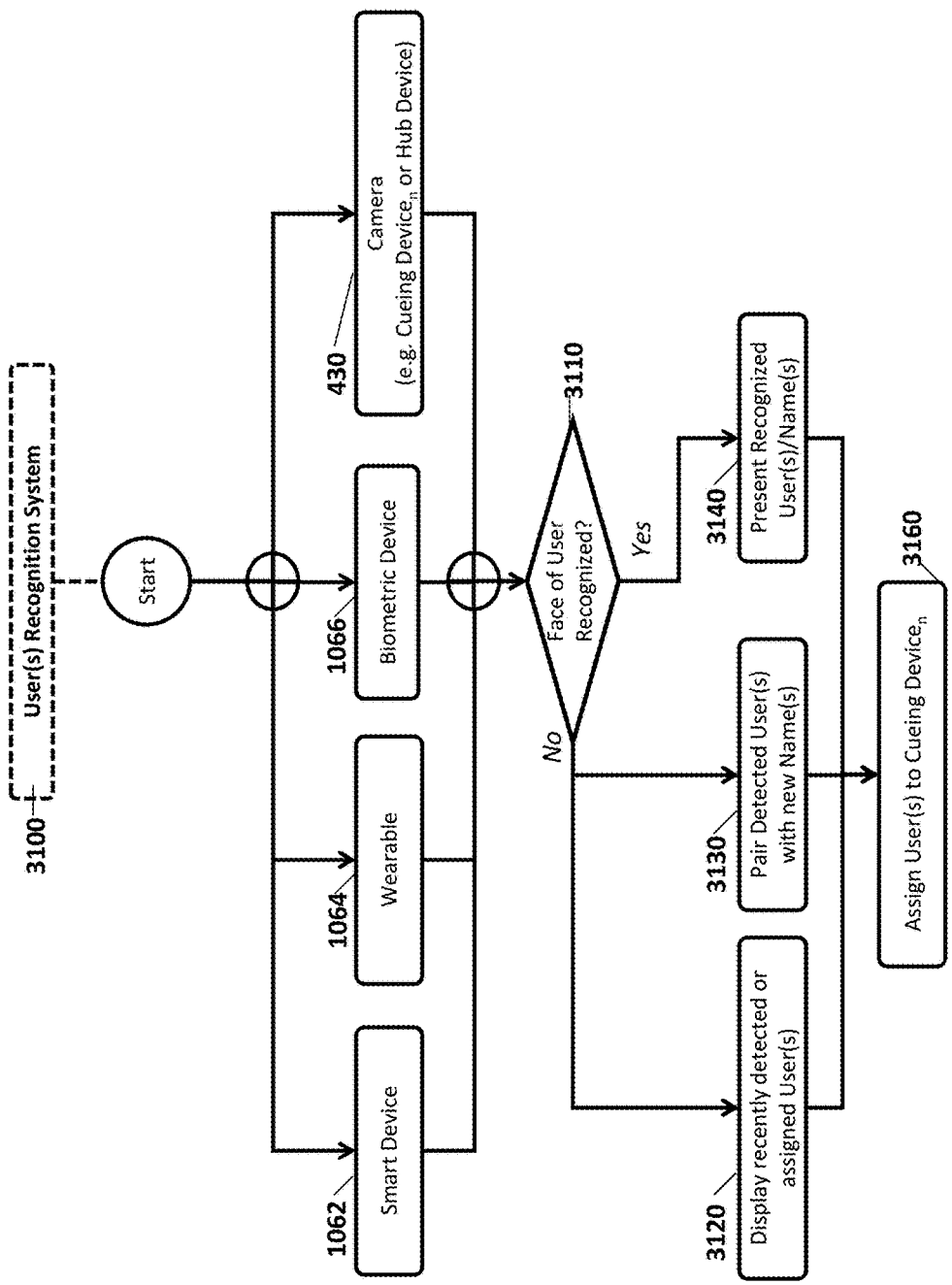
FIG. 15B illustrates a block diagram of a system and process of recognizing users near one or more cueing devices or hub device(s), according to an embodiment.

FIG. 15B is a block diagram illustrating a system and process 3100 of determining the presence of specific people near one or more cueing devices 100 or a hub device 150, according to some embodiments. In an embodiment, one or more blocks in process 3100 can correspond to, or be performed by, a user, processor, and/or controller. Although the process 3100 is described herein with reference to a particular order, in various embodiments, blocks herein can be performed in a different order, or omitted, and additional blocks can be added.

There are many techniques for identifying a specific user 190. For example, a smart device 1062, wearable device 1064, and/or biometric device 1066 can, when requested from a trusted device, wirelessly return the name or ID of its wearer, which can then be received by a nearby cueing device 100 or hub device 150. Relevant IDs are made known to the system 99 during initial setup at block 1060 (FIG. 10), and at any subsequent time thereafter. Further, the system 99 is established as a trusted source to third party devices at block 1007 (FIG. 10). In a preferred embodiment, a combination of input data from one or more devices 1062, 1064, and 1066 can be used to increase the confidence of user recognition.

In an alternate technique of the user recognition process 3100, if a user 190 does not have any smart devices on their person, then a camera 430 can be employed to facilitate face recognition at block 3110. By applying standard facial recognition algorithms to the images supplied at block 1070 (FIG. 10), one or more matches can be established at block 3140 to identify the users. Alternatively, if the user 190 is not recognized at block 3110, then a user 190 can assign a name to the detected face at block 3130 or choose from recently detected or assigned users at block 3120, in a case where the user is already in the system but the user's appearance has changed or is otherwise not properly recognized by the system.

Figure 16:
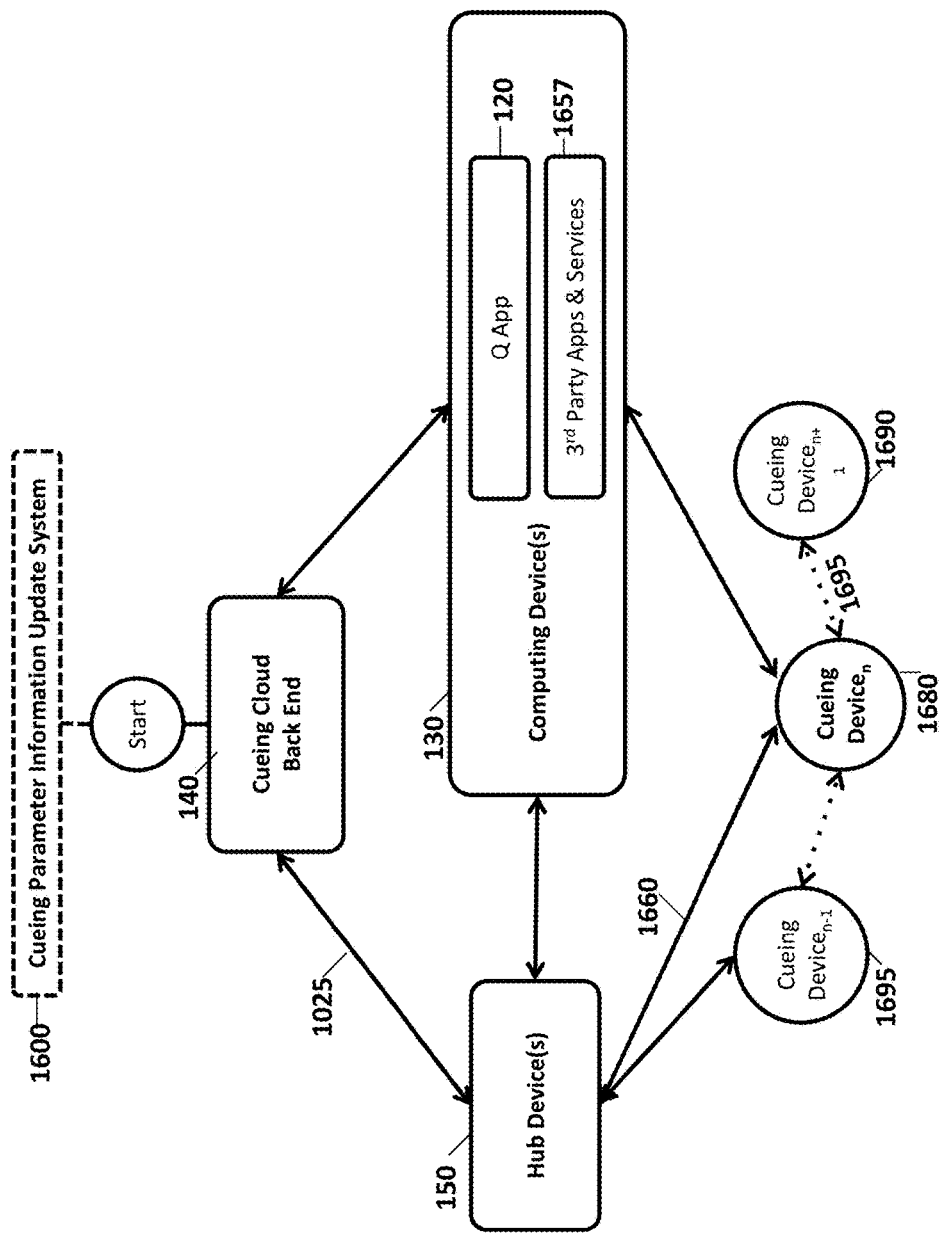
FIG. 16 illustrates a block diagram for keeping all associated devices and elements of the cueing system up to date, according to an embodiment.

FIG. 16 is a block diagram illustrating a system 1600 for keeping some or all devices and elements of the system 99 up to date with the latest information which can include, but is not limited to, user 190 information, sensor information, device specific information, etc., according to some embodiments. In an embodiment, one or more aspects of the system 1600 can correspond to, or be performed by, a user, processor, and/or controller. Although the system 1600 is described herein with reference to a particular arrangement of aspects, in various embodiments, aspects herein can be rearranged or reconnected, or omitted, and additional aspects can be added.

In the illustrated embodiment, the cloud back end 140 keeps track of some or all active cueing devices 100 and hub device devices 150, as well as some or all associated cueing parameters and parameter values for a given cueing device 100 or hub device devices 150. In an embodiment wherein a user 190 is using a hub device 150 in conjunction with cueing devices 100, the hub device 150 facilitates the transfer of information between the cloud backend 140 and itself via a network connection 1025 such as with Wi-Fi™ or cellular. The hub device 150 then facilitates the transfer of information from the cloud to itself and between one or more cueing devices through communication connections 1680 and 1695, for example via a wireless network interface 1660 such as Bluetooth™, Zigbee™, etc. If a cueing device 1690 is out of range of the hub device 150, it can still be kept up to date via its mesh network connection 1695 to other cueing devices 1680 within its range.

In another embodiment wherein a user 190 is only using cueing devices 100 without a hub device 150, the facilitation of information between the cloud backend 140 and cueing devices 100 can take place through third party computing devices 130 that are running either the cueing application 120 or third party applications or services 1657 that have been linked at block 1007 (FIG. 10) to the cueing system 99. The cloud back end 140 keeps track of some or all authentication, updates and notifications from the third party applications and services. In still another embodiment, the data displayed on cueing devices 100 and or the hub device 150 can be customized to display one or more parameters based on user preferences through the cueing application 120 or cueing cloud back end 140.

Figure 17:
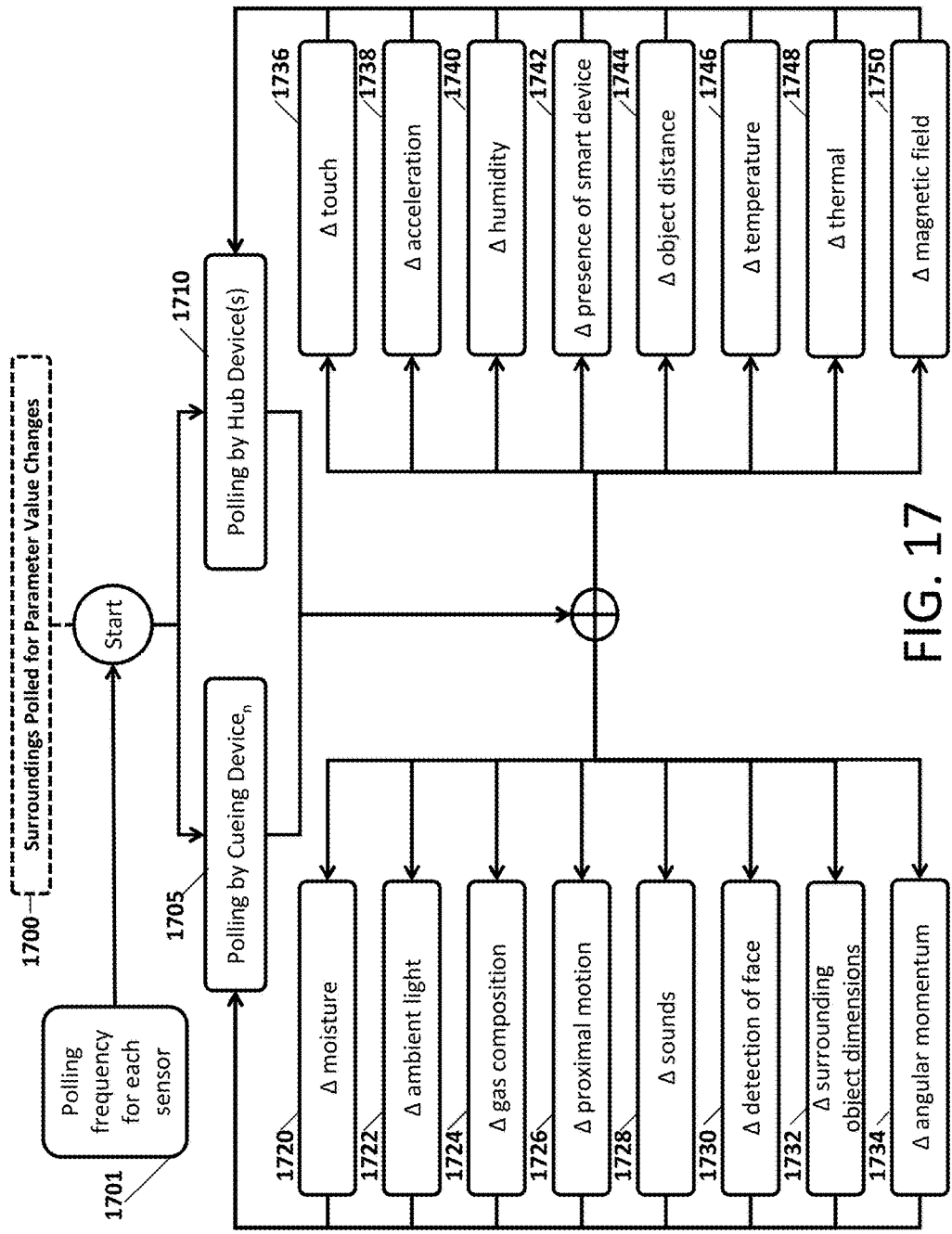
FIG. 17 illustrates a block diagram of a system and process of actively polling all cueing devices and hub device(s), according to an embodiment.

FIG. 17 is a block diagram illustrating a system and process 1700, according to various embodiments, of actively polling (at block 1705) cueing devices 100 and polling (at block 1710) hub device(s) 150 for the detection of any changes in the vicinity such as environment, users, objects, etc. In an embodiment, one or more blocks in process 1700 can correspond to, or be performed by, a user, processor, and/or controller. Although the process 1700 is described herein with reference to a particular order, in various embodiments, blocks herein can be performed in a different order, or omitted, and additional blocks can be added.

Figure 26:
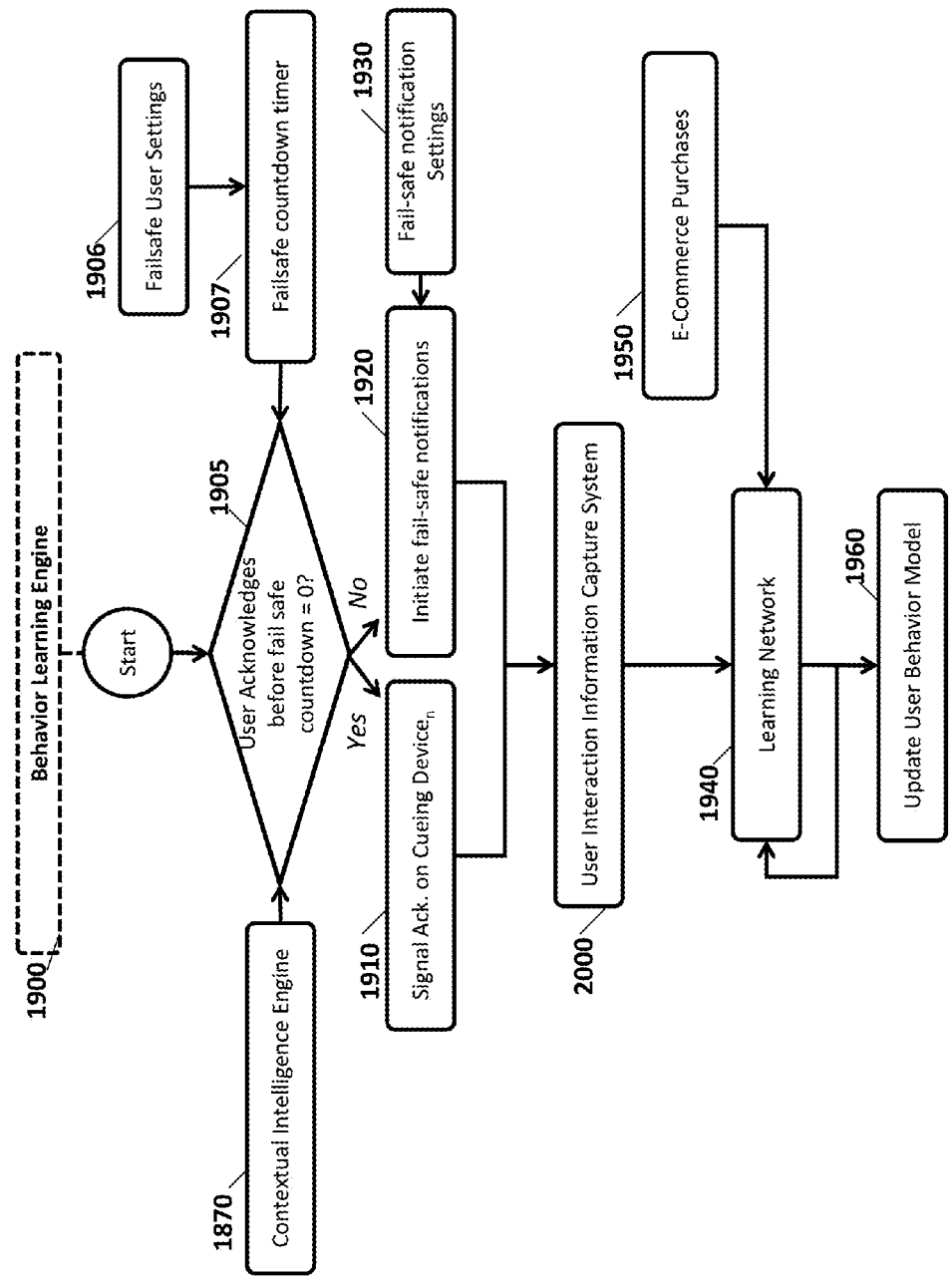
FIG. 26 illustrates a flow chart for a method of learning the behaviors of individual users, according to an embodiment.

Various polling techniques for different sensor types are shown in blocks 1720 through 1750. For example, polling by a cueing device 100 at block 1705 can be triggered by a change in sensed moisture at block 1720; a change in sensed ambient light at block 1722; a change in a sensed gas composition at block 1724; a change in sensed proximal motion at block 1726; a change in sensed sounds at block 1728; a face detection at block 1730; a change in sensed dimensions for surrounding objects at block 1732; and a change in angular momentum at block 1734. Similarly polling by a hub device at block 1710 can be triggered by a change in sensed touch at block 1736; a change in acceleration at block 1738; a change in sensed humidity at block 1740; a sensed presence of a smart device at block 1742; a change in sensed object distance at block 1744; a change in temperature at block 1746; a change in sensed thermal energy at block 1748; or a change in sensed magnetic field at block 1750. However, these are not limiting examples and various embodiments can support any type of sensor, for example where its output quantifies a change in some physical state. The polling frequency of each sensor 1720 through 1750 can be set in an independent or combined manner at block 1701. As an example of one technique of the process 1700, an increase in ambient light at block 1722, such as what transpires upon opening a refrigerator, freezer or pantry can be detected by a cueing device 100 polling at block 1705, wherein the polling frequency can be optimized over time, at block 1701, based on feedback from Behavior Learning Engine at block 1900 (FIGS. 9 and 26).

Figure 18:
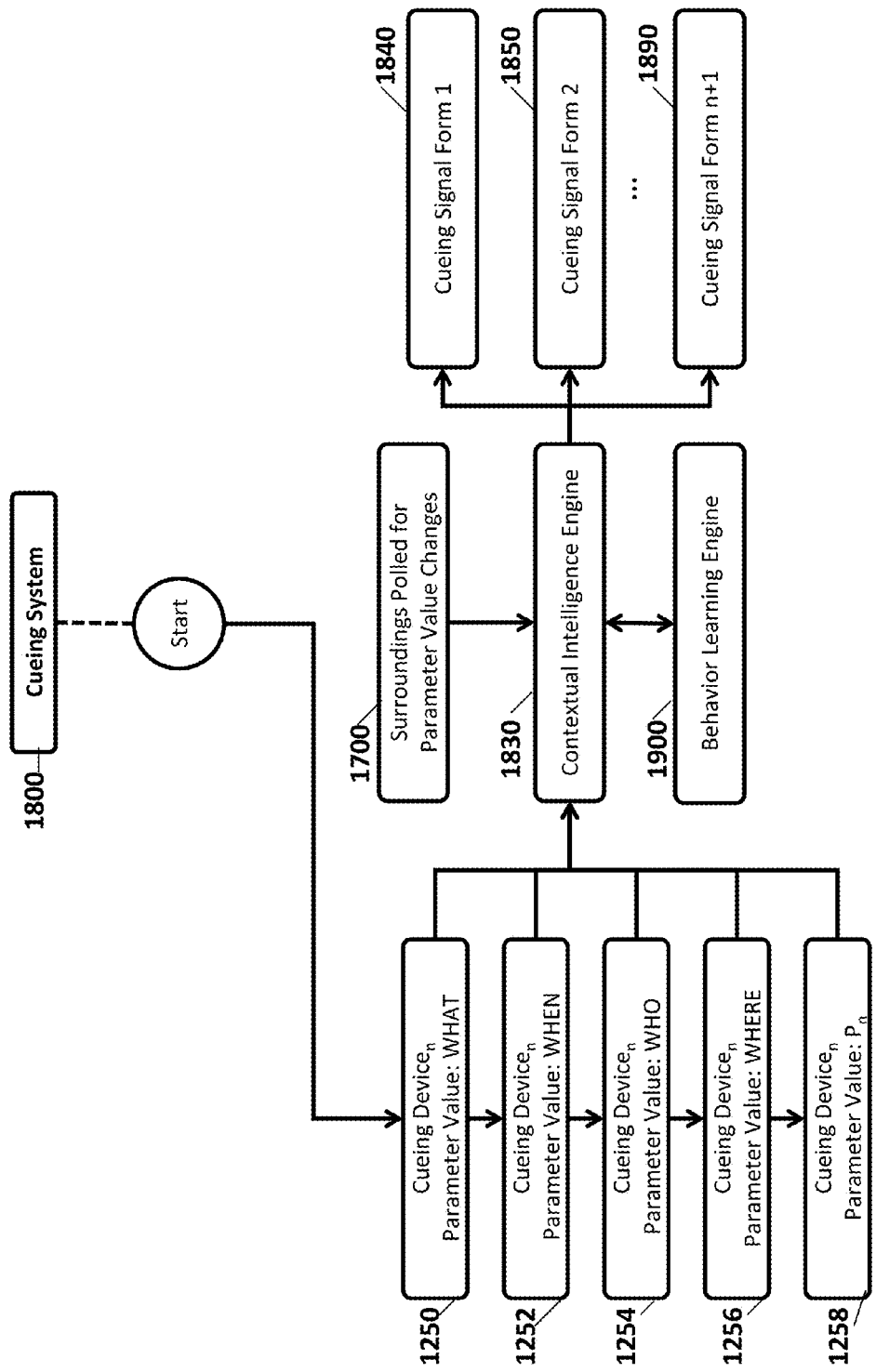
FIG. 18 illustrates a block diagram of a system and process of cueing the attention of one or more users, according to an embodiment.

FIG. 18 is a block diagram illustrating a system and process 1800 of cueing the attention of one or more users 190 to a specific cueing device 100 that has been associated with a time sensitive object so that the user(s) can be reminded to take action on that object, according to some embodiments. In an embodiment, one or more blocks in process 1800 can correspond to, or be performed by, a user, processor, and/or controller. Although the process 1800 is described herein with reference to a particular order, in various embodiments, blocks herein can be performed in a different order, or omitted, and additional blocks can be added.

In the illustrated embodiment, the cueing process 1800 takes as input the cueing parameter values 1250 through 1258 (FIG. 12), changes in sensor state from block 1700 (FIG. 17), and preferably past user behaviors from block 1900 (FIGS. 9 and 26) to determine through contextual intelligence engine, at block 1830, if the threshold value for a given cueing parameter has been met and, if it has been met, to then trigger one of the cueing signals at blocks 1840 through 1890. The contextual intelligence network at block 1830 employs popular artificial intelligence approaches, such as but not limited to statistical methods, machine learning, etc., to process all of the aforementioned input data and determine whether a given threshold has been met.

In various embodiments, a device (such as, for example, the device 400 of FIG. 4) can determine the context for alerting a user to a status of the time-sensitive object, for example using the contextual intelligence engine 1830. In an embodiment, the processor 490 (FIG. 4) can retrieve cueing parameters and/or contextual determinations from the memory 450 (FIG. 4) in order to determine whether to cue the user. Accordingly, the device 400 can selectively cue the user based on the cueing parameters, for example when the appropriate context is reached. In various embodiments, the device 400 determining the context can be the associated cueing device 100 (FIG. 1) itself, the hub device 150 (FIG. 1), or any other device in the cueing system 99 (FIG. 1), including remote server processing.

FIG. 19A provides six use case examples, 4010 through 4060, that will be used to illustrate the formation of different cueing signals in response to the different cueing parameter value examples provided in FIG. 19A, according to some embodiments. Further, for each use case, at least one of the cueing parameters is varied between two values for illustrative purposes, as shown in bold (for example, at entry 4015). The corresponding signal waveforms for each of the use case examples are then shown in FIGS. 20-25.

FIG. 19B provides examples of lookup tables for determining the type of cueing waveform signals that could be broadcast, according to some embodiments. The values throughout FIG. 19B are provided herein for exemplary purposes only, and actual values can be continually adjusted and optimized for each user's interaction and behavior patterns via the behavior learning engine 1900 as they use the system 99.

In order for a cueing signal to effectively catch the attention of the intended user(s) 190, and also not be tuned out thereby losing its effectiveness over time, the cueing signal should preferably take as input, and continually adjust to, the ever-changing behavioral (row 4070), sensorial (row 4075), physiological (row 4080), and adaptive (row 4085) response of the intended user(s) 190.

In various embodiments, cueing behavior can be varied based on a cueing reminder frequency, which can be designated on an absolute (for example, 'daily') or relative (for example, 'infrequent') basis. For example, in the illustrated embodiment, the behavioral response 4070 is varied based on a cueing reminder frequency. For example, whether the cueing reminder type 4071 is 'Infrequent' (e.g., once every several weeks or months), 'Recurring' (e.g., every few days), or 'Daily'. For example, when the reminder type is infrequent, catching the attention of certain users 190 can be made more effective by presenting the cueing signal with a longer envelope duty cycle 4073 because the user 190 is not expecting it; whereas when the reminder type is daily, catching the attention of certain users 190 can be made more effective through the cueing of signals with a shorter envelope duty cycle because it minimizes the likelihood of the cueing signal losing its effectiveness over time.

In various embodiments, cueing behavior can be varied based on an urgency and/or predicted effectiveness of cueing. For example, in the illustrated embodiment, the sensorial response 4075 is varied based on catching the attention of a user 190 by targeting one or more of the senses such as sight, sound and touch (columns 4077). For example, if a 'Time to Expire' value 4076 has just 1 day remaining, communicating the level of attention needed by a user 190 can be made more effective by presenting a cueing signal with a bolder color like red because for certain users 190 that is a stronger call to attention; whereas when there are 3 days remaining for certain users 190 it is more effective to signal with the color yellow to communicate less urgency is needed.

Thus, cueing behavior can be varied based on an environmental context. For example, in the illustrated embodiment, the physiological response 4080 is varied based on improving the effectiveness of catching the attention of a user 190 by taking as input the surrounding environment 4081 of the cueing device 100, such as whether it is dark, bright, noisy, serene, etc. For example, in a noisy environment catching the attention of a user 190 with an aural signal could be made more effective by increasing the amplitude of the sound wave signal (i.e., higher volume) to compensate; whereas when it is serene in that same location it can be more effective and pleasing for certain user 190 to have a softer aural signal by decreasing the amplitude (i.e., lower volume).

Moreover, cueing behavior can be varied based on a adaptive learning techniques. For example, in the illustrated embodiment, the adaptive response 4085 is varied based on optimizing the effectiveness of the cueing signal for each user 190 based on feedback from the behavior learning engine at block 1900 (FIGS. 9 and 26) by adapting the signaling parameter values like those depicted in behavioral 4070, sensorial 4075, and physiological 4080 blocks. For example, if it is learned that a user 190 prefers to be reminded without aural feedback for a specific object, that can be applied as a filter to the signal 4086 (e.g., A1, A2, An). As will be explained in further detail below, adaptive responses are determined either implicitly through analyzing past response characteristics of a user 190 to different cueing signals or through explicit feedback from a user 190 as to what they find effective or not effective.

FIG. 20 illustrates the two example waveforms for the embodiment of Case 1 4010 of FIG. 19A. Referencing the parameter values in FIG. 19A, the 'What' parameter 1250 has the value 'Recurring' which corresponds to an envelope duty cycle 4073 of 'Short', as shown in FIG. 19B, and is illustrated by signal envelope 1845, as shown in FIG. 20.

Returning to FIG. 19A for Case 1, the 'WHEN' parameter 1252 has two values: the time to expiration value of 1 day, which in 4077 of FIG. 19B corresponds to a visual hue frequency of 'Red', an aural tone frequency of 'High Pitch', and a haptic vibration signal of 'Low Spin'; and has the time to expiration value of 3 days which corresponds to a hue frequency of 'Yellow', an aural tone frequency of 'Low Pitch', and a haptic vibration signal of 'High Spin'. These different signals are illustrated by 1842 through 1844 in waveforms 1846 and 1848, as shown in FIG. 20.

Because of its inherent capability to be contextually aware of when users 190 are in the vicinity of cueing devices 100 and or hub devices 150, one or more of the cueing signals can be broadcast not only from cueing devices 100 and hub devices 150 but also via one or more smart devices 1062 or wearable devices 1064 that are expected to be on or near the user (see FIG. 10). For example, when the system 99 detects that a user 190 with a smart phone 1062 and wearable device 1064 on their person is near to a cueing device 100, the system 99 can broadcast the visual signal from the cueing device 100, the aural signal from the wearable device 1064 and the haptic signal from the smart phone 1062, or additionally or alternatively through any combination of one or more signals across one or more different devices. Accordingly, the cueing system 99 can adjust cueing based on a location of the user and/or cueing device 100.

Returning again to the parameter values in FIG. 19A for the embodiment of Case 1, the 'WHERE' parameter 1256 has value 'Dark' and 'Noisy,' which corresponds to a visual hue amplitude of 'Low Lumens' and an aural tone amplitude of 'High Volume' and a haptic vibration amplitude of 'High Power' as correlated via 4081 of FIG. 19B.

Figure 21:
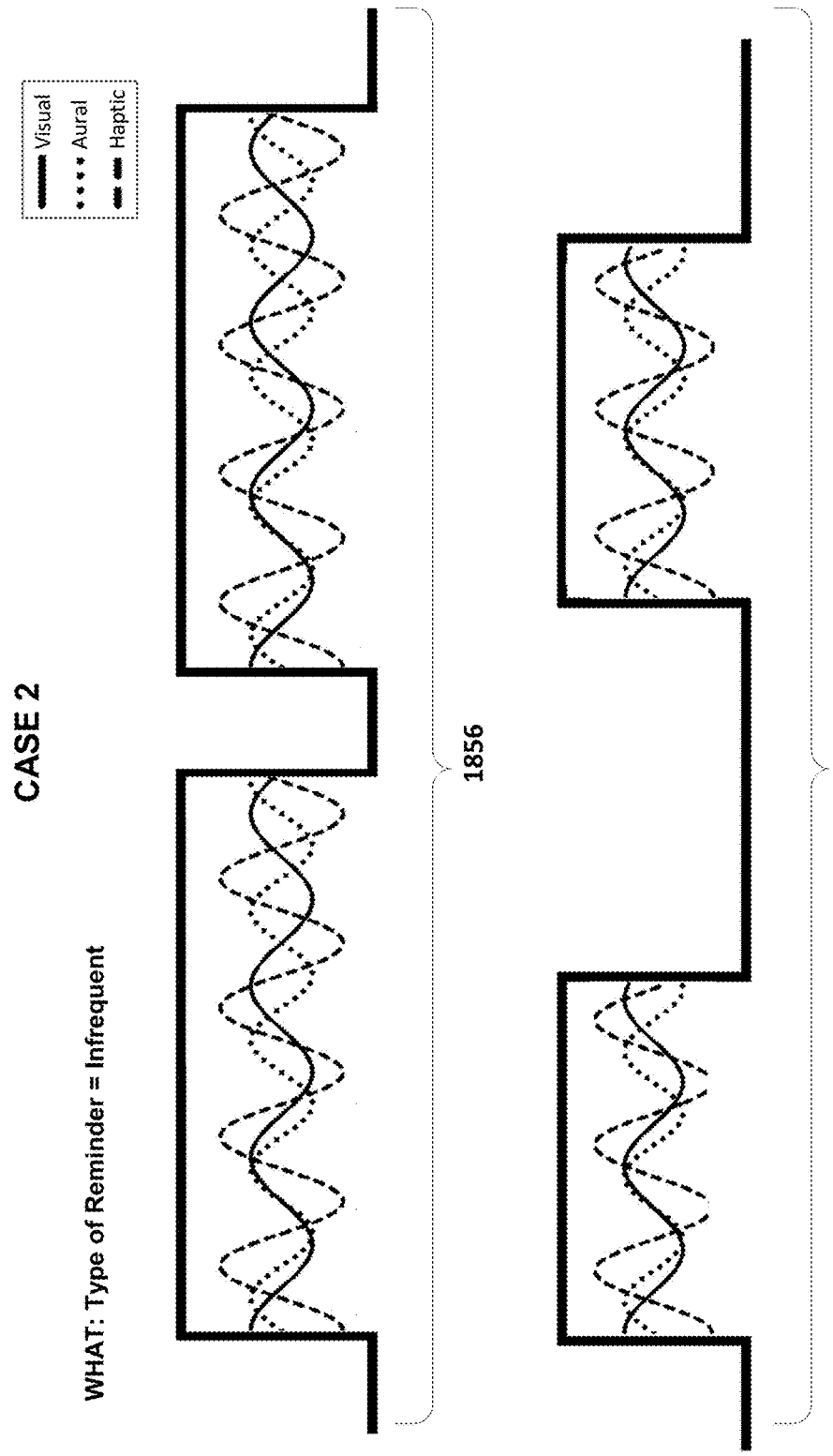
FIG. 21 illustrates two example waveforms for Case 2 of FIG. 19A.

FIG. 21 illustrates how the cueing signal varies between two different values for the 'What' parameter type for the embodiment of Case 2 4020: a waveform 1856 illustrating the long envelope duty cycle for the reminder type 'Infrequent' and a waveform 1858 illustrating the medium long envelope duty cycle for the reminder type 'Recurring'. As shown, a frequency or periodicity of cueing can be adjusted based on the reminder type cueing parameter. In addition, because the 'WHERE' parameter 1256 has values 'Dark' and 'Serene', the waveform has the same visual hue amplitude as in Case 1 but the aural tone amplitude is now 'Low Volume' and the haptic vibration amplitude is now 'Medium Power' (i.e., the average of High Power and Low Power).

FIG. 22 illustrates how the cueing signal varies between two different values 'Bright' and 'Dark' for the 'WHERE' parameter type for the embodiment of Case 3 4030. As shown, a method and/or intensity of cueing can be adjusted based on a detected environmental context. A waveform 1866 illustrates a visual signal with high amplitude and a haptic signal with low amplitude for the 'Bright' state; and a waveform 1868 illustrates a visual signal with low amplitude and a haptic signal with high amplitude for the 'Dark' state. Note that the aural signal in unaffected by the change in light of the environment so its amplitude is unchanged between the two waveforms.

FIG. 23 illustrates how the cueing signal varies when learned behavior from a specific user 190 is applied as illustrated in the embodiment of Case 4 4040. As shown, the cueing signal can be adjusted based on observed effectiveness and/or explicit designation on a per-user basis. A waveform 1876 illustrates the default waveform for a set of parameter values and a waveform 1878 illustrates how the signal varies for the same parameter values when the learned behavior is applied as signal filter 'A1'. Referring back to FIG. 19B, the signal filter 'A1,' in the exemplary adaptive table 4085, corresponds to learned behavior "Prefers sound over vibration" which could have been learned, for example, through explicit user 190 feedback and 'A1' also corresponds to learned behavior "Higher response rate with 'High' for 'Recurring' reminder type" which could have been learned, for example, implicitly by comparing and analyzing the user's response to variant cueing signals over multiple interactions with the cueing system 99. Returning to FIG. 23, it can be seen in 1878 that, as a result of applying the signal filter 'A1', the haptic signal is zeroed out and the envelope duty cycle is set to 'Long'.

FIG. 24 illustrates how the cueing signal varies between two different users 190 for the same object and parameter values for the embodiment of Case 5 4050. As shown, the type and/or intensity of cueing signal employed can be selected based on a detected or intended user identity. A waveform 1886 is the same as the waveform 1878, and is reproduced in FIG. 24 for easy reference to the waveform 1888. The waveform 1888 is modified according to the A2 filter for John, according to column 4086 in FIG. 19B, where Mary and John have inverse preferences and response rates for two parameter values, as illustrated in the differences between waveforms 1886 and 1888. It should be noted that, although the difference between Mary and John is presented as applying to their preferences for any object, the signal filters 4086 can be applied at the individual object Objx level 4008 (FIG. 19A) such that behavioral learning optimizes the experience, not just among different users 190 but among different objects (e.g., perishable food type, particular medicine, etc.) for the same user.

FIG. 25 illustrates how the cueing signal varies when multiple parameter values are changed at the same time as shown in the embodiment of Case 6 4060. A waveform 1896 illustrates a time to expiration value of 1 with the A1 signal filter; whereas a waveform 1898 illustrates a time to expiration value of 3 with the A1 signal filter.

FIG. 26 is a block diagram illustrating a system and process 1900 of learning the behaviors of individual users 190, for example to improve and optimize their user 190 experience with the system 99, according to some embodiments. In an embodiment, one or more blocks in process 1900 can correspond to, or be performed by, a user, processor, and/or controller. Although the process 1900 is described herein with reference to a particular order, in various embodiments, blocks herein can be performed in a different order, or omitted, and additional blocks can be added.

At block 1905, upon a cueing device 100 signaling a reminder, if the intended user 190 sees the reminder and acknowledges the reminder at block 1910 before a failsafe countdown timer 1907 reaches zero (e.g., defaulted to n minutes and user 190 adjustable via failsafe user settings at block 1906), the behavioral aspects of the of the interaction of the user 190 with the signal and the acknowledgment are captured at block 2000 and then fed to a learning network at block 1940, wherein the behavior interaction model of that user 190 is updated at block 1960. For example, the behavior learning engine 1900 might determine, after a statistically significant number of iterations, that a given user 190 is more responsive when signaled with sound and vibration instead of light. As such, on subsequent assignment of a cueing device 100 to the same object Objx, that learning will be fed back into the system 99 via the behavior learning engine 1900. Returning to block 1905, if the user 190 fails to acknowledge the reminder before the failsafe countdown reaches zero, fail safe procedures at block 1920 will automatically initiate. For example, a fail-safe setting 1930 might trigger an automated call to a primary user 2052 (FIG. 27) or to one or more of secondary user(s) 2054 (FIG. 27), as will be explained with respect to FIG. 27 below. Further, the fact the user 190 failed to acknowledge in time is also fed into the learning network at block 1940 to improve response rate for future cueing interactions.

Figure 27:
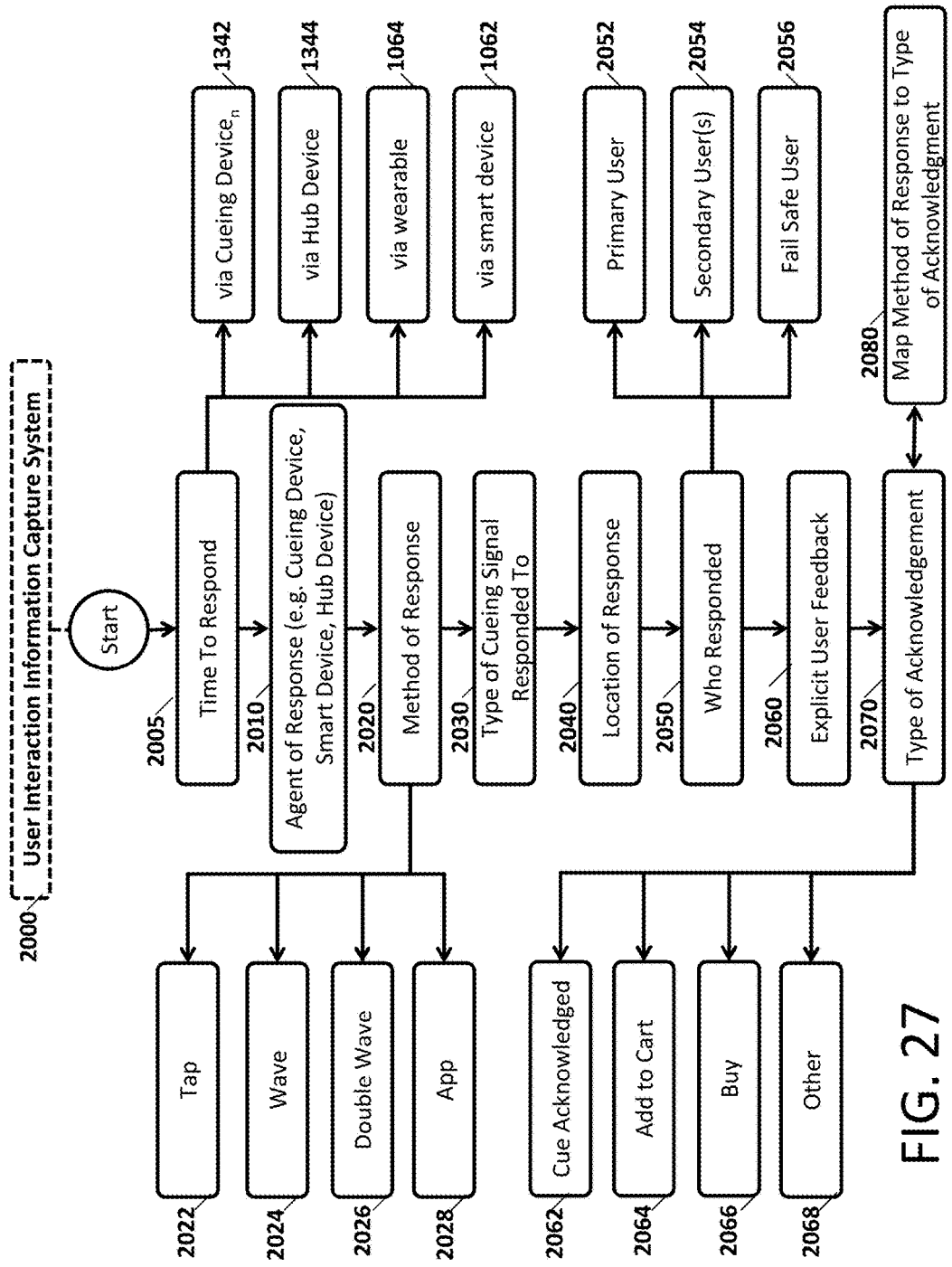
FIG. 27 illustrates a block diagram of a user interaction information capture system, according to an embodiment.

FIG. 27 is a block diagram illustrating a user 190 interaction information capture system and process 2000 of capturing both the act and nature of acknowledgement, according to some embodiments. In an embodiment, one or more blocks in process 2000 can correspond to, or be performed by, a user, processor, and/or controller. Although the process 2000 is described herein with reference to a particular order, in various embodiments, blocks herein can be performed in a different order, or omitted, and additional blocks can be added.

At block 2005, within the allocated time to respond, the user 190 can initiate acknowledgement on any device or application (at block 2010) associated with the system 99. The method of response (at block 2020) is captured, which can include but is not limited to a tap (at block 2022) on a screen, capacitive surface, or physical button on a cueing device 100 or a third party device, or a wave or double wave (at blocks 2024-2026) over a cueing device 100 with gesture sensor capability or through an application at block 2028 (for example, the cueing application 120 or linked application at block 1027). As multiple types of cueing signals can be employed, the specific type of signal that was active at the time of acknowledgement (block 2030), the location of acknowledgement (block 2040) and the identity of the user 190 who acknowledged (block 2050) are also captured.

As shown in FIG. 27, the user who acknowledges a cueing signal can be any of a primary user 2052, a secondary user 2054, or a fail-safe user 2056. The primary user 2052 can be, for example, the user primarily associated with the time-sensitive object. The primary user 2052 can be the person to whom priority is given for cueing (and can be one or more users). The secondary user 2054 can be, for example, another user associated with the time-sensitive object, but for whom priority is not given for cueing (and can be one or more users). The fail-safe user 2056 can be, for example, a person associated with the time-sensitive object as a last resort (and can be one or more users). Accordingly, as discussed above with respect to FIG. 26, the setting 1930 might trigger an automated call (e.g., a telephone call or any other communication or cueing signal discussed herein) to the fail-safe user 2056 when calls to the primary user 2052 and/or secondary user(s) 2054 are not acknowledged. In other aspects, cueing behaviors other than priority can be adjusted based on user classifications (e.g., primary user 2052, secondary user 2054, or fail-safe user 2056) such as, for example, types of cueing signals employed, intensity of cueing signals, frequency of cueing signals, destinations of cueing signals, and so on.

Furthermore, the user 190 can provide explicit feedback at block 2060 as to parameter values that he or she finds effective such as use of aural instead of haptic feedback for a certain object. The type of acknowledgement that the user 190 provides is itself also captured at block 2070. The base case is that a user 190 simply acknowledges the cueing signal at block 2062, for example through the tap (at block 2022) on a screen, capacitive surface or physical button on a cueing device 100, hub device 150, or application (at block 2028). Correlating the type of acknowledgement at block 2070 to the method of response at block 2020 is managed through a mapping process at block 2080 which is initialized with common mappings but which are changed and optimized through user 190 feedback.

The type of acknowledgment can also serve to signal to the system 99 the interest of a particular user 190 in re-purchasing that item because the user 190 has observed it is almost depleted, in which case a unique gesture such as double wave at block 2026 can be used to 'add' the same product to an shopping cart at block 2064 of a user's linked shopping system (e.g., Amazon™), and another unique gesture such as triple wave could signal interest in immediately buying at block 2066 the product. Still other types of acknowledgment at block 2068 can be mapped to additional actions such as resetting a cueing device 100.

Figure 28:
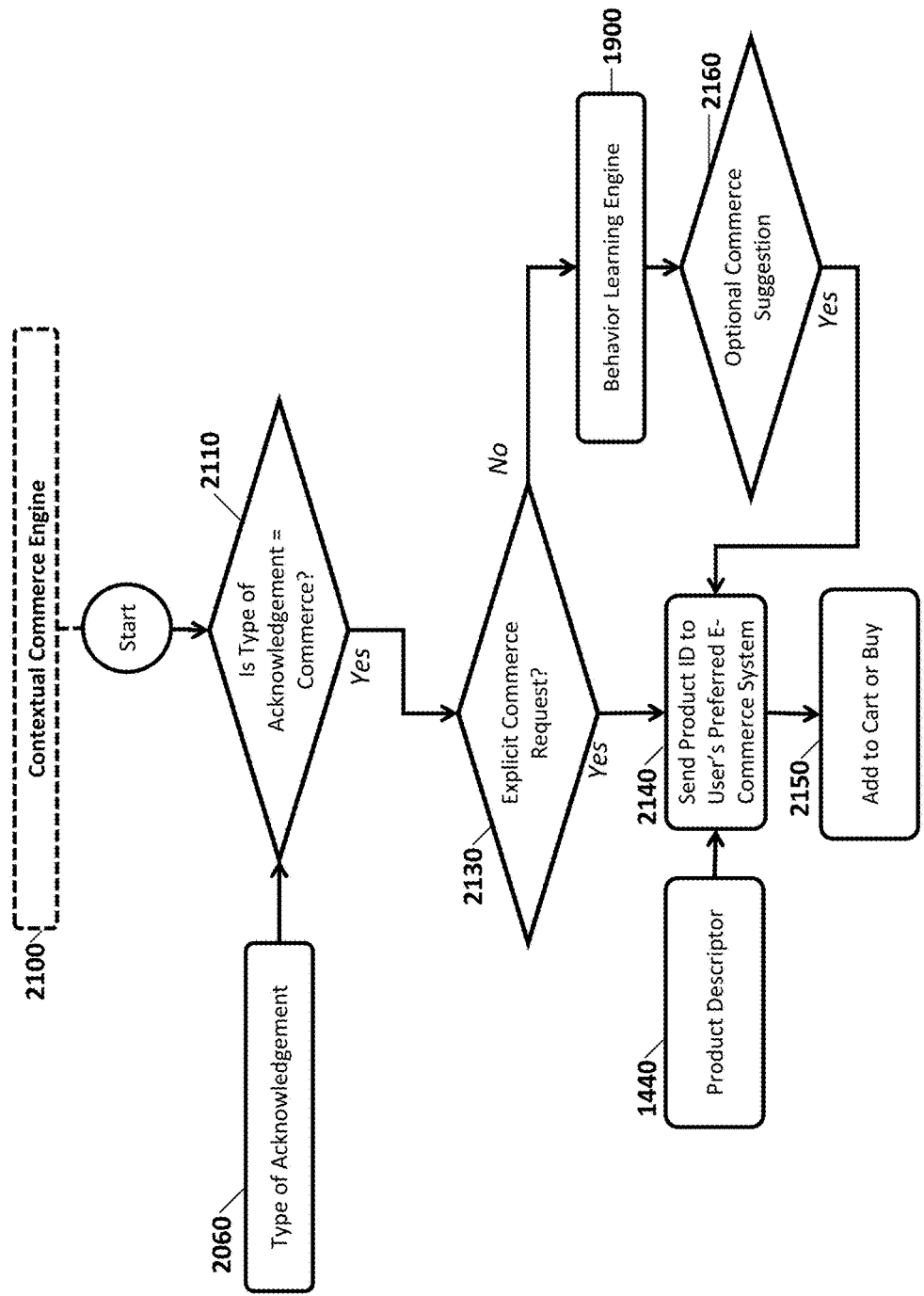
FIG. 28 illustrates a block diagram of a contextual commerce engine, according to an embodiment.

FIG. 28 is a block diagram detailing the contextual commerce engine 2100, according to some embodiments. In an embodiment, one or more blocks in the contextual commerce engine 2100 can include actions, parameters, or components that can correspond to, or be performed by, a user, processor, and/or controller. Although the contextual commerce engine 2100 is described herein with reference to a particular order, in various embodiments, blocks herein can be performed in a different order, or omitted, and additional blocks can be added.

At block 2110, if a cueing device 100 or other system 99 device or application receives an explicit commerce request at block 2130, the associated product descriptor 1440 (FIG. 14) of that object is passed to that user's preferred shopping system at block 2140 through standard application programming interface (API) exchange protocols (e.g., API of Amazon™). Choosing and linking to a preferred shopping system is carried out as part of system initialization at block 1000 (FIG. 10), such as, for example, block 1007, as detailed in FIG. 10. Based on the user's method of response at block 2020 (FIG. 27), the product is added to the cart for future or real-time purchase at block 2150. Alternatively, the behavior engine 1900 (FIG. 26) can make product purchase suggestions based on past purchase frequency. For example, if the behavior engine 1900 (FIG. 26) observes a user's regular pattern of using the cueing system 99 of adding a certain object to their shopping cart every n days, an optional commerce suggestion (at block 2160) can be provided to the user 190 as a purchase suggestion/action on any computing device 130 that is associated with the cueing system 99.

Figure 29:
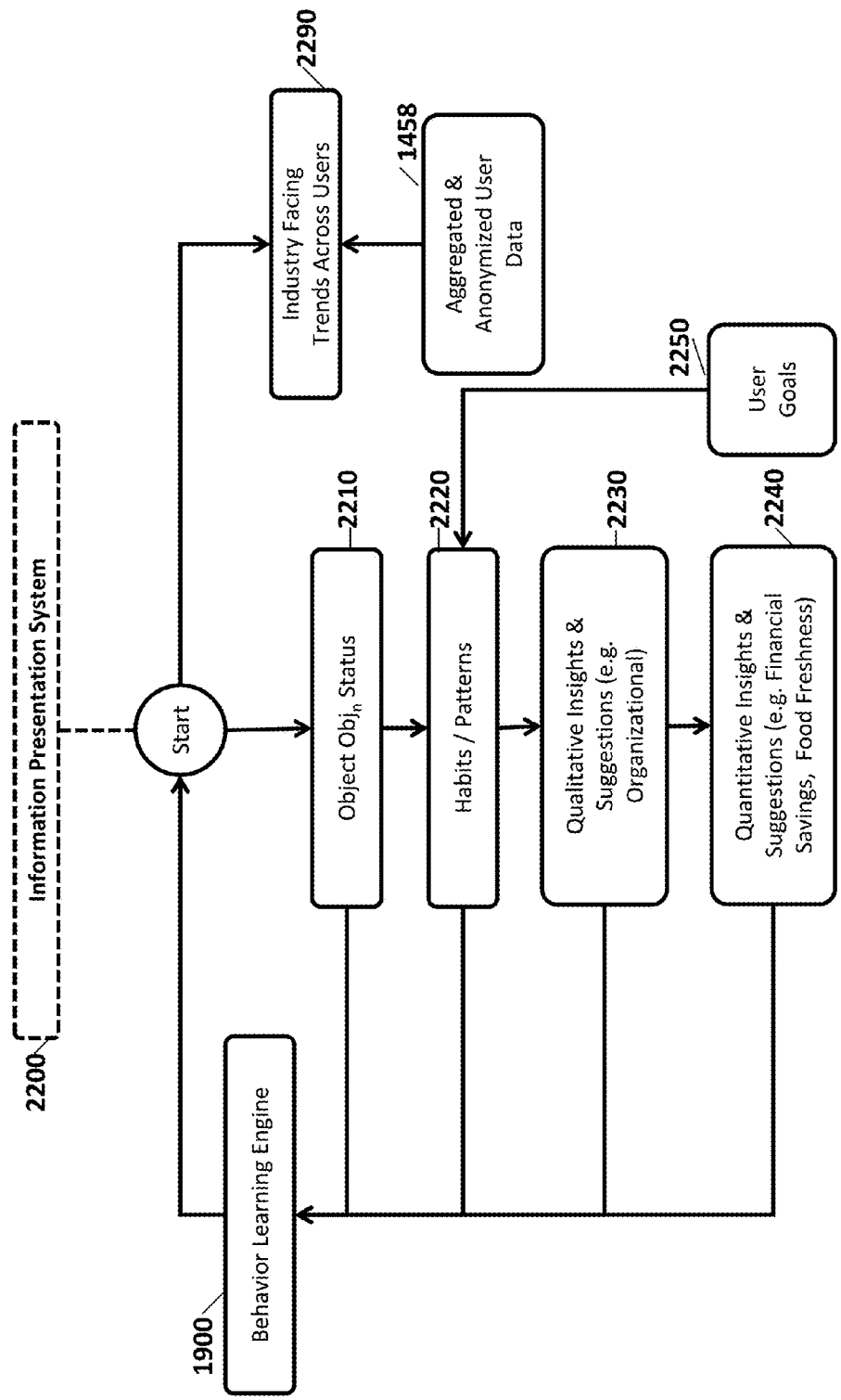
FIG. 29 illustrates a block diagram of an information presentation system, according to an embodiment.

FIG. 29 is a block diagram showing a system and process 2200 of presenting information pertaining to the user 190 experience back to the user, according to some embodiments. In an embodiment, one or more blocks in process 2200 can correspond to, or be performed by, a user, processor, and/or controller. Although the process 2200 is described herein with reference to a particular order, in various embodiments, blocks herein can be performed in a different order, or omitted, and additional blocks can be added.

In various embodiments, presenting information can include cueing device 100 status for any tracked object (e.g., perishable item or calendar appointment) at block 2210 such as whether or not a user 190 has interacted with a certain cueing device 100, which in turn would suggest cueing success or failure such as, for example, if they remembered to take their lunch associated with that cueing device. This can also include a user's habits or patterns observed over multiple uses of the product at block 2220 such as informing a user 190 that they have the greatest need to be reminded about certain objects on a particular day or time such as, for example, Tuesday mornings. In various embodiments, block 2220 can also receive as input one or more user goals at block 2250. Examples of user goals include saving X foods each month or having family members make Y incremental healthy food choices each week.

In various embodiments, presenting information can include presenting qualitative insights and suggestions at block 2230, for example suggestions to move a certain food to a different location in the refrigerator in order to prolong freshness through more optimal temperature. In various embodiments, presenting information can include presenting quantitative insights and suggestions at block 2240 such as total money saved in averted food waste costs through use of the system 99. In various embodiments, presenting information can include presenting trend information across users 190 at block 2290, that can be provided to manufacturers and retailers such as, for example, a ratio between how quickly a particular product brand is consumed versus discarded by a given market demographic, as informed by aggregated and anonymized user 190 data at block 1458 (see also FIG. 14). In various embodiments, presenting information can include indicating progress, failure, or success relative to user goals 2250.

In various embodiments, a method of contextual cueing can be implemented in whole or in part by the devices described herein. Although various aspects of the method is described herein with reference to the cueing system 99 (FIG. 1), the cueing device 100 (FIG. 1), and/or the hub device 150 (FIG. 1), a person having ordinary skill in the art will appreciate that any process, flowchart, or method described herein can be implemented by another device described herein, or any other suitable device. Although various processes, flowcharts, and methods are described herein with reference to a particular order, in various embodiments, blocks and/or steps herein can be performed in a different order, or omitted, and additional blocks and/or steps can be added.

In one embodiment, a method of contextual cueing can include associating a time-sensitive object with a cueing device. For example, with reference to the example Cases 1-6 shown in FIGS. 19A-19B, the cueing device 100 can be physically or logically associated with an object Objx. In various embodiments, the associated object Objx can include any of a food, a medication, a product to be acted upon, a product to be purchased, a product to be disposed, and an item to be delivered. In one particular example, the associated object Objx can include a perishable item such as food or medication.

The method can further include receiving an input indicating a cueing parameter. In various embodiments, the input can be received via a physical input such as a button, microphone, detection camera, motion sensor, touch pad, etc. In other embodiments, the input can be received via a remote input such as via a smart phone or hub device 150 connected to the cueing device via a wireless communications network. Accordingly, as used herein, "input" can include both physical inputs and logical inputs received via a communications network. In certain embodiments, "input" refers to parameters or other data actively entered in some way by a user, as opposed to passive detection via one or more sensors. For example, with reference to the example Case 1 shown in FIGS. 19A-19B, the cueing device 100 can receive a voice recognition input via the microphone 411 indicating that the "WHEN" cueing parameter 1252 should be set to 1 and 3 days. As another exampled, with reference to the example Case 2 shown in FIGS. 19A-19B, the cueing device 100 can receive, through the network interface 420, input (via a smart phone communicating with the cueing device 100 via a wireless communications network) that the "WHAT" cueing parameter 1250 should be set to infrequent and recurring reminders. Thus, the cueing parameter can indicate any of: a type of reminder, a time to expiration, an environmental context for cueing, and a target user.

In various embodiments, object association can include one or more of: physical attachment and proximal association. Physical attachment can include one or more of: attaching with a magnet, a clip, a band, an adhesive, a fastener, a container, and a lid. Proximal association can include including one or more of: placement of the cueing device within a threshold distance from the time-sensitive object, placement of the cueing device abutting the time-sensitive object, and placement of the cueing device within the time-sensitive object.

In various embodiments, object association can include associating one or more locations with the time-sensitive object, including determining a location of the cueing device and/or the time-sensitive object via one or more of: manual input and radio position detection. In various embodiments user association can include associating one or more particular users with the time-sensitive object, including determining an associated user via one or more of: a computing device associated with the user, a wearable device associated with the user, a biometric device associated with the user, and biometric recognition of the user.

In some embodiments, object association can additionally or alternatively be performed logically. Thus, a device (such as, for example, the device 400 of FIG. 4) can logically associate (as opposed to, or in addition to physically associating) a time-sensitive object with a cueing device. For example, a processor such as the processor 490 (FIG. 4) can store a representation of the time-sensitive object in a memory such as the memory 450 (FIG. 4). Logical object and/or user association is further discussed with respect to FIG. 11.

The method can further include determining cueing parameters indicative of an urgency of the time-sensitive object and a context for alerting the user to a status of the time-sensitive object. For example, with reference to the example Cases 1 shown in FIGS. 19A-19B, the processor 490 of the cueing device 100 can determine a low urgency after 1 day, based on the 1-day expiration parameter set by the user. Similarly, the processor 490 of the cueing device 100 can determine a high urgency after 3 days, based on the 1-day expiration parameter set by the user.

As another example, with reference to the example Case 5 shown in FIGS. 19A-19B, the processor 490 of the cueing device 100 can determine a cueing context including users Mary or John in bright and serene environments. User detection can be performed, for example, via facial recognition, while relative brightness can be determined via the ambient light sensor 407. Relative serenity can be determined via the microphone 411.

In various embodiments, determining cueing parameters can include automatically determining the cueing parameters of the time-sensitive object by performing a database lookup, via a wireless network, based on one or more of: a category, a name, a cost, a barcode, an image, a radio-frequency identification, a near-field communication, and a molecular structure of the time-sensitive object.

In various embodiments, determining cueing parameters can include associating, with the time-sensitive object, via a user input, at least one of: one or more particular users to be cued to the time-sensitive object, one or more locations or environmental factors, wherein environmental factors comprise one or more of an environmental brightness level and an environmental loudness level, a time to expiration of the time-sensitive object, a type of alert to be used when cueing the user to the time-sensitive object, and one or more object names and/or descriptors, wherein descriptors comprise one or more of a label, picture, temperature, and message.

In various embodiments, determining one or more cueing parameters can include detecting, via one or more sensors, at least one of: a moisture level, an ambient light, a gas composition, a proximal motion, one or more sounds, detection of a face, surrounding object dimensions, angular momentum, a touch, acceleration, humidity, presence of a computing device, a distance to the time-sensitive object, a temperature, a thermal signature, and a magnetic field.

The method can further include cueing the user based on the cueing parameters. For example, with reference to the example Cases 1 shown in FIGS. 19A-19B, the processor 490 of the cueing device 100 can initiate a low-intensity visual cue (for example, via LED(s) 471) after determining low urgency after 1 day, and in view of the dark and noisy environmental context. Similarly, the processor 490 of the cueing device 100 can initiate a high-intensity visual cue (for example, via LED(s) 471) after determining high urgency after 3 days, and in view of the dark and noisy environmental context.

As another example, with reference to the example Case 5 shown in FIGS. 19A-19B, the processor 490 of the cueing device 100 can initiate a low-intensity aural cue (for example, via speaker 470) after determining low urgency one day prior to object expiration, and in view of the bright and quiet environmental context.

In various embodiments, cueing the user can include selecting a cueing signal based on the cueing parameters and one or more behavioral factors. In various embodiments, the method can further include updating the cueing parameters based on a user acknowledgement or one or more behavioral factors. In various embodiments, the cueing signal can include one or more of: a visual hue, an aural tone, and a haptic vibration frequency.

In various embodiments, the method can further include varying a relative urgency as between each of the visual hue, aural tone, and haptic vibration frequency. In various embodiments, the one or more behavioral factors comprise one or more of: a user acknowledgment, historical success or failure of one or more cueing signals, a failsafe countdown timer and/or notification setting, and historical produce purchases. In various embodiments, the method can further include receiving, from the user, an acknowledgement to a cueing signal, and recording at least one acknowledgement parameter comprising: a time to respond, an agent of response, a method of response, a type of cueing signal acknowledged, a user identification, a user feedback, or a type of acknowledgement, or a combination thereof.

In various embodiments, the method can further include initiating one or more product purchases based on the at least one acknowledgement parameter, wherein initiating the product purchases comprises one or more of: adding a product to an electronic shopping cart and authorizing payment for a product. In various embodiments, the method can further include providing information to the user based on the at least one acknowledgement parameter, wherein said information comprises one or more of: user habits or patterns, qualitative suggestions, and quantitative suggestions.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or objects, optical fields or objects, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

As used herein, a phrase referring to "at least one of" a list of items refers to any combination of those items, including single members. As a first example, "at least one of a and b" (also "a or b") is intended to cover a, b, and a-b, as well as any combination with multiples of the same element (e.g., a-a, a-a-a, a-a-b, a-b-b, b-b, b-b-b, or any other ordering of a and b). As a second example, "at least one of: a, b, and c" (also "a, b, or c") is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method implemented by a smart hub, the smart hub comprising an optical imaging device, an output configured to alert a user, and one or more processors, and the method comprising:
   identifying a perishable item to be tracked, and a user of a plurality of users to be alerted regarding a status of the perishable item;
   obtaining information indicative of one or more cueing parameters, the one or more cueing parameters indicating, at least, a time associated with expiration of the perishable item; and
   generating an alert, for output to the user, based on the obtained information, the alert being adapted to increase user responsiveness to the alert, and the adaptation being based on user information associated with the user that indicates user responses to prior alerts.

2. The method of claim 1, wherein the one or more cueing parameters further indicate environmental characteristics affecting the perishable item.

3. The method of claim 1, wherein the environmental characteristics are obtained from a cueing device comprising sensors that detect the environmental characteristics, and the cueing device being proximally associated with the perishable item.

4. The method of claim 2, wherein the sensors comprise one or more of a camera, a microphone, a temperature sensor, a humidity sensor, a pressure sensor, an ambient light sensor, an air quality sensor, a spectrophotometric sensor, accelerometer, gyroscope, or infrared sensor.

5. The method of claim 1, wherein identifying a perishable item comprises:
obtaining images of the perishable item from the optical imaging device, and identifying the perishable item based on the images.

6. The method of claim 1, further comprising:
receiving, from the user, an acknowledgement to the alert, wherein receiving comprises one or more of:
receiving an interaction, from the user, with a touchscreen display of the system, the interaction representing an acknowledgement, or
receiving images, from the optical imaging device of the system, illustrating a gesture performed by the user, the gesture representing an acknowledgement; and
updating the user profile associated with the user.

7. The method of claim 1, further comprising:
generating trend information associated with use of the perishable item by the user, wherein the trend information is provided to an outside system for aggregation with trend information associated with one or more other users.

8. A system configured to alert a user of a plurality of users to a perishable item, the system comprising:
an optical imaging device configured to obtain images of persons or perishable items;
an output configured to alert the user; and
one or more processors and non-transitory computer storage media storing instructions that, when executed by the one or more processors, cause the processors to perform operations comprising:
identifying a perishable item to be tracked, and the user of the plurality of users to be alerted regarding a status of the perishable item;
obtaining information indicative of one or more cueing parameters, the one or more cueing parameters indicating, at least, a time associated with expiration of the perishable item; and
generating an alert, to be provided via the output, based on the obtained information, wherein the alert is configured to be adapted based on user information associated with the user to increase responsiveness to the alert by the user, the user information indicating user responses to prior alerts.

9. The cueing device of claim 8, wherein the system is part of a refrigerator.

10. The system of claim 9, wherein the one or more cueing parameters further indicate environmental characteristics affecting an inside of the refrigerator.

11. The system of claim 8, wherein the system is in communication with a cueing device associated with the perishable item, and wherein the cueing device comprises sensors configured to detect environmental characteristics affecting the perishable item.

12. The system of claim 8, wherein the perishable item is identified based on images, obtained via the optical imaging device, of the perishable item.

13. The system of claim 8, wherein the perishable item is identified based on receipt of verbal or textual identification, from the user, of the perishable item.

14. The system of claim 8, further comprising an input capable of receiving, from the user, an acknowledgement of the alert.

15. The system of claim 8, wherein the input is received from a user device of the user.

16. The system of claim 15, wherein the input comprises a microphone.

17. The system of claim 8, wherein the operations further comprise setting, based on voice recognition input via a microphone, the time associated with expiration of the perishable item.

18. The system of claim 15, wherein the input comprises a touch-sensitive display.

19. The system of claim 8, wherein the operations further comprise:
identifying, based on images of the user illustrating one or more gestures, that the user acknowledged the alert.

20. The system of claim 8, wherein a plurality of perishable items are tracked.

21. The system of claim 9, wherein the operations further comprise:
determining an identify of the user, and obtaining user information associated with the identified user.

22. The system of claim 21, wherein determining an identity of the user comprises:
obtaining, via the optical imaging device, one or more images of a person; and
identifying, based on facial recognition, the person as corresponding to the user.

23. The system of claim 21, wherein determining an identity of the user is based on detecting information associated with a user device utilized by the user.

24. The system of claim 8, wherein the output comprises a display, and wherein the alert is presented on the display.

25. The system of claim 8, wherein the output comprises a display, and wherein status information associated with the perishable item is presented on the display.

26. The system of claim 8, wherein the output is an aural output.

27. The system of claim 8, wherein generating an alert is further based on one or more cueing parameters indicative of an urgency associated with the perishable item.

28. A system comprising:
a plurality of cueing devices associated with a plurality of users, the cueing devices being proximally associated with perishable items, and the cueing devices tracking interactions by users with the perishable items; and
a system of one or more computers, the system centrally aggregating information obtained from the cueing devices, wherein the one or more computers perform operations comprising:
obtaining information associated with use of a type perishable item by one or more of the plurality of users;
aggregating the obtained information and generating trend information associated with the type of perishable item; and
providing, for presentation, the trend information,
wherein each cueing device is configured to generate alerts associated with perishable items, the alerts being generated based on environmental characteristics affecting the perishable items, and the alerts being adapted to users based on user profiles indicating monitored user responses to prior alerts.

29. The system of claim 28, wherein the trend information describes consumption of the type of perishable item.

30. The system of claim 29, wherein the trend information indicates a ratio between times associated with consumption of the type of perishable item and/or times associated with discarding the type of perishable item.

31. The system of claim 29, wherein the trend information is associated with a particular demographic of user.

32. The system of claim 28, wherein the operations further comprise:
   prior to aggregation, anonymizing the obtained information to remove user information.

33. The system of claim 28, wherein the alerts are generated based on environmental characteristics affecting the perishable items and one or more cueing parameters indicative of urgencies associated with the perishable items.

* * * * *

UNITED STATES PATENT AND TRADEMARK OFFICE
CERTIFICATE OF CORRECTION

PATENT NO. : 10,198,701 B2
APPLICATION NO. : 15/681012
DATED : February 5, 2019
INVENTOR(S) : Harris Gabriel Romanoff It is certified that error appears in the above-identified patent and that said Letters Patent is hereby corrected as shown below:

In the Claims

Column 29, Line 55, Claim 9, change "cueing device" to --system--.

Signed and Sealed this
Twenty-third Day of July, 2019

Andrei Iancu
*Director of the United States Patent and Trademark Office*